(12) United States Patent
Takase et al.

(10) Patent No.: US 11,652,707 B2
(45) Date of Patent: May 16, 2023

(54) NETWORK MANAGEMENT SYSTEM AND METHOD

(71) Applicant: Hitachi, Ltd., Tokyo (JP)

(72) Inventors: Masayuki Takase, Tokyo (JP); Takaaki Suzuki, Tokyo (JP); Nodoka Mimura, Tokyo (JP); Junnosuke Wakai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 17/207,214

(22) Filed: Mar. 19, 2021

(65) Prior Publication Data

US 2022/0060392 A1 Feb. 24, 2022

(30) Foreign Application Priority Data

Aug. 20, 2020 (JP) .............................. JP2020-139209

(51) Int. Cl.
*H04L 41/50* (2022.01)
*H04L 12/46* (2006.01)
*H04L 61/5007* (2022.01)

(52) U.S. Cl.
CPC .............. *H04L 41/50* (2013.01); *H04L 12/46* (2013.01); *H04L 61/5007* (2022.05)

(58) Field of Classification Search
CPC ...... H04L 41/50; H04L 61/5007; H04L 12/46
USPC .......................................................... 709/223
See application file for complete search history.

(56) References Cited

U.S. PATENT DOCUMENTS

| 6,795,445 | B1* | 9/2004 | Kabie | H04L 47/828 370/469 |
| 2005/0041584 | A1* | 2/2005 | Lau | H04W 24/02 370/235 |
| 2023/0004864 | A1* | 1/2023 | Wang | G06N 20/00 |
| 2023/0006935 | A1* | 1/2023 | Low | H04L 47/24 |

FOREIGN PATENT DOCUMENTS

JP 2018-191148 A 11/2018

* cited by examiner

*Primary Examiner* — James E Springer
(74) *Attorney, Agent, or Firm* — Crowell & Moring LLP

(57) ABSTRACT

Constructed is a network management system which manages, in an integrated manner, a first communication system, a second communication system and a third communication system passed through by packets that are sent and received via wireless communication between a first device and a second device. The network management system performs information setting to these communication systems for dividing a communication system group, which includes these communication systems, into a plurality of logical partitions each corresponding to a plurality of different service levels based on the management information of each of these communication systems. A logical partition corresponding to a service level with regard to each of the plurality of different service levels is a partition passed through by packets that are sent and received via wireless communication between the first device and the second device belonging to that service level.

15 Claims, 17 Drawing Sheets

COMPARATIVE EXAMPLE

FIG. 8

SERVICE MANAGEMENT TABLE
521

| ENTRY ID | SERVICE LEVEL NAME | RAN PRIORITY SETTING | MBH PRIORITY SETTING | LAN PRIORITY SETTING |
| --- | --- | --- | --- | --- |
| 1 | CTL-NW | High | High | High |
| 2 | Info-NW | Medium | Medium | Medium |
| 3 | Office-NW | Low | Low | Low |

FIG. 9

| ENTRY ID 901A | PRIORITY 902A | FLOW IDENTIFIER 903A | VALUE 904A | VEPC NAME 905A | QCI 906A | SIM ID 907A |
|---|---|---|---|---|---|---|
| 1 | High | LAYER 3 VEPC IP ADDRESS | 1 | APN 1 | 4 | 1, 2, 3, 4, 5 |
| 2 | Medium | LAYER 3 VEPC IP ADDRESS | 2 | APN 2 | 3 | 6, 7, 8 |
| 3 | Low | LAYER 3 VEPC IP ADDRESS | 3 | APN 3 | 2 | 9, 10, 11, 12 |

522A

| ENTRY ID 901B | PRIORITY 902B | FLOW IDENTIFIER 903B | VALUE 904B | VEPC NAME 905B | QCI 906B | SIM ID 907B |
|---|---|---|---|---|---|---|
| 1 | High | LAYER 3 IP DSCP | 4 | APN 1 | 4 | 1, 2, 3, 4, 5 |
| 2 | Medium | LAYER 3 IP DSCP | 3 | APN 2 | 3 | 6, 7, 8 |
| 3 | Low | LAYER 3 IP DSCP | 2 | APN 3 | 2 | 9, 10, 11, 12 |

522B

| ENTRY ID 901C | PRIORITY 902C | FLOW IDENTIFIER 903C | VALUE 904C | VEPC NAME 905C | QCI 906C | SIM ID 907C |
|---|---|---|---|---|---|---|
| 1 | High | LAYER 2 VLAN | 1 | APN 1 | 4 | 1, 2, 3, 4, 5 |
| 2 | Medium | LAYER 2 VLAN | 2 | APN 2 | 3 | 6, 7, 8 |
| 3 | Low | LAYER 2 VLAN | 3 | APN 3 | 2 | 9, 10, 11, 12 |

SERVICE MANAGEMENT TABLE
521

| ENTRY ID | USER ID | GUARANTEED MINIMUM BANDWIDTH | SERVICE LEVEL NAME | RAN PRIORITY SETTING | MBH PRIORITY SETTING | LAN PRIORITY SETTING |
|---|---|---|---|---|---|---|
| 1 | 1 | 20Mbps | CTL-NW | High | High | High |
| 2 | | 50Mbps | Info-NW | Medium | Medium | Medium |
| 3 | | Best effort | Office NW | Low | Low | Low |
| 4 | 2 | 20Mbps | CTL-NW | High | High | High |
| 5 | | Best effort | Info-NW | Medium | Medium | Medium |
| 6 | | Best effort | Office NW | Low | Low | Low |
| ... | | | | ... | ... | ... |

FIG. 17

| ENTRY ID (901A) | GUARANTEED MINIMUM BANDWIDTH (1701A) | PRIORITY (902A) | ... |
|---|---|---|---|
| 1 | 20Mbps | High | ... |
| 2 | 50Mbps | Medium | ... |
| 3 | 20Mbps | Low | ... |

| ENTRY ID (1001B) | GUARANTEED MINIMUM BANDWIDTH (1801B) | PRIORITY (1002B) | ... |
|---|---|---|---|
| 1 | 20Mbps | High | ... |
| 2 | 50Mbps | Medium | ... |
| 3 | 20Mbps | Low | ... |

| SERVICE ID (1201B) | GUARANTEED MINIMUM BANDWIDTH (1901B) | PRIORITY (1202B) | ... |
|---|---|---|---|
| 1 | 20Mbps | High | ... |
| 2 | 50Mbps | Medium | ... |
| 3 | 20Mbps | Low | ... |

524B

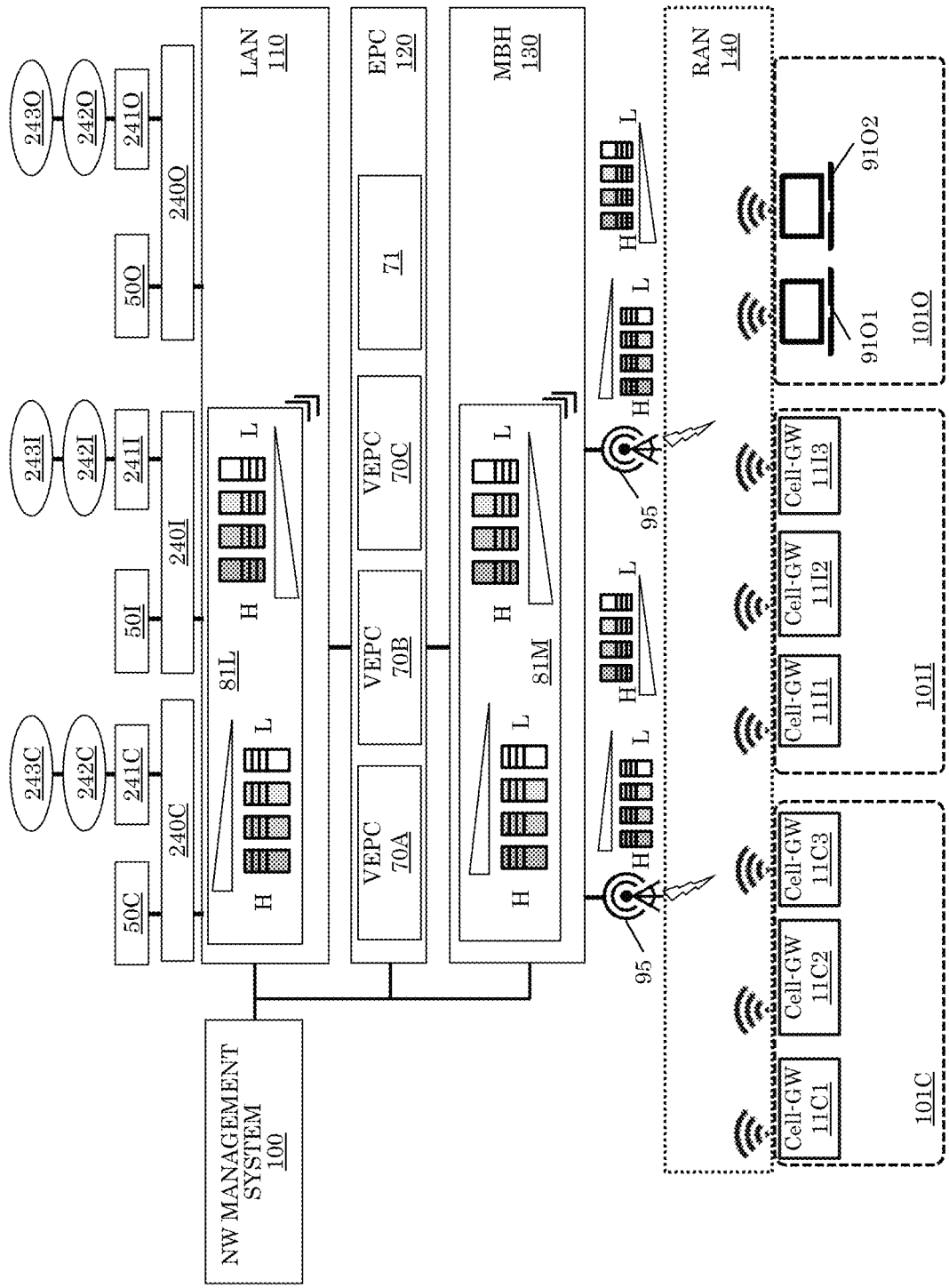

NETWORK MANAGEMENT SYSTEM AND METHOD

CROSS-REFERENCE TO PRIOR APPLICATION

This application relates to and claims the benefit of priority from Japanese Patent Application number 2020-139209, filed on Aug. 20, 2020 the entire disclosure of which is incorporated herein by reference.

BACKGROUND

The present invention generally relates to network management.

There are various types of requirements (for instance, tolerable delay time, required communication quality, and required bandwidth) in relation to a network (NW). For the sake of convenience, one or more types of requirements regarding a network are hereinafter referred to as a "service level".

There is an environment that uses a plurality of networks each having a different service level. As an example of this type of environment, there is a factory. For example, as shown in FIG. 1, as networks in the factory, a plurality of networks such as a Field-NW, a CTL-NW, an Info-NW and an Office-NW are constructed. The Field-NW is a network between industrial equipment and a PLC (Programmable Logic Controller). The CTL-NW is a network used in the communication between controllers (CTLs). As controllers, for example, there are a PLC, an HMI (Human Machine Interface), an MES (Manufacturing Execution System) and SCADA (Supervisory Control And Data Acquisition). The Info-NW is a network used in the communication between an MES and ERP (Enterprise Resources Planning), or communication between cameras within the factory (for instance, camera 1 and camera 2) and ERP (or another device). The Office-NW is a network used in the communication between PCs (Personal Computers) in an office inside or outside the factory.

Generally speaking, these networks are physically separated. Specifically, these networks are wired networks so that they can each satisfy their designated requirements.

Nevertheless, when all networks are wired networks, it is difficult to promptly deal with high-mix low-volume production. The reason for this, for instance, is as follows. With high-mix low-volume production, the production line needs to be rearranged. For each rearrangement of the production line, the networks need to be redesigned (in the example shown in FIG. 1, for instance, the CTL-NW and the Info-NW need to be redesigned). In order to redesign wired networks, much time is required (for instance, one week) since it involves a physical design change of the cable connection and the reexamination of the network setting. Moreover, due to the rearrangement of the production line, increase in the required resources (for instance, network equipment or sites where the networks can be laid) may frequently occur.

Moreover, as an example of a wireless network standard, known is 5G/LTE (5G (5th Generation) or LTE (Long Term Evolution)). A 5G/LTE network is stable in comparison to a wireless LAN (Local Area Network). Moreover, a person other than an MNO (Mobile Network Operator) can also construct a 5G/LTE network. Thus, it is considered that certain companies are now starting to consider introducing a 5G/LTE network internally (introduction of local 5G or private LTE). Companies may also consider introducing a 4G (4th Generation) network in substitute for a 5G network.

As one example, considered may be substituting a wired network in a factory with a wireless network such as a 5G/LTE network. For example, as illustrated in FIG. 2, the Field-NW having a short tolerable delay time may continue to be a wired network, but the respective networks other than the Field-NW may be changed to a wireless network.

Nevertheless, in the foregoing case, two or more networks having a different service level will become flat. As a result, packets having a different service level will coexist and, therefore, it becomes difficult to satisfy the service level of each network.

PTL 1 discloses a control method of guaranteeing the communication quality of each packet. With this control method, QoS parameters related to the QoS (Quality of Service) of a bearer to be newly established are decided based on the parameters contained in the received user packet, a bearer based on the decided QoS parameters is newly established, and the user packet is relayed via the established bearer.

[PTL 1] JP2018-191148

SUMMARY

Even when the technology disclosed in PTL 1 is used, data may coexist in two or more networks having a different service level. Specifically, for example, when the parameters of user packets in two or more networks having a different service level are the same (for instance, when both of the user packets in those networks are for large capacity use), these user packets may coexist in the same network.

Packets that are sent and received via wireless communication between a plurality of first devices and a plurality of second devices pass through a first communication system, a second communication system and a third communication system. Constructed is a network management system which manages these communication systems in an integrated manner. The network management system manages management information of each of the first communication system, the second communication system and the third communication system. The network management system performs information setting to the first communication system, the third communication system and the second communication system for dividing a communication system group, which includes the first communication system, the second communication system and the third communication system, into a plurality of logical partitions each corresponding to a plurality of different service levels based on the management information of each of the first communication system, the second communication system and the third communication system. The third communication system is a core network. The first communication system is a network which connects the core network and one or more base stations which engage in wireless communication with the plurality of first devices. The second communication system is a network which connects the core network and the plurality of second devices. A logical partition corresponding to a service level with regard to each of the plurality of different service levels is a partition passed through by packets that are sent and received via wireless communication between the first device and the second device belonging to that service level.

According to the present invention, it is possible to avoid the coexistence of packets having a different service level.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a diagram showing a configuration example of the service management table according to the first embodiment.

FIG. 9 is a diagram showing a configuration example of the EPC management table according to the first embodiment.

FIG. 16 is a diagram showing a configuration example of the service management table according to the second embodiment.

FIG. 17 is a diagram showing a part of the configuration example of the EPC management table according to the second embodiment.

FIG. 18 is a diagram showing a part of the configuration example of the MBH management table according to the second embodiment.

FIG. 19 is a diagram showing a part of the configuration example of the LAN management table according to the second embodiment.

FIG. 21 is a diagram showing a configuration example of the overall system according to the third embodiment.

DESCRIPTION OF EMBODIMENTS

Figure 1:
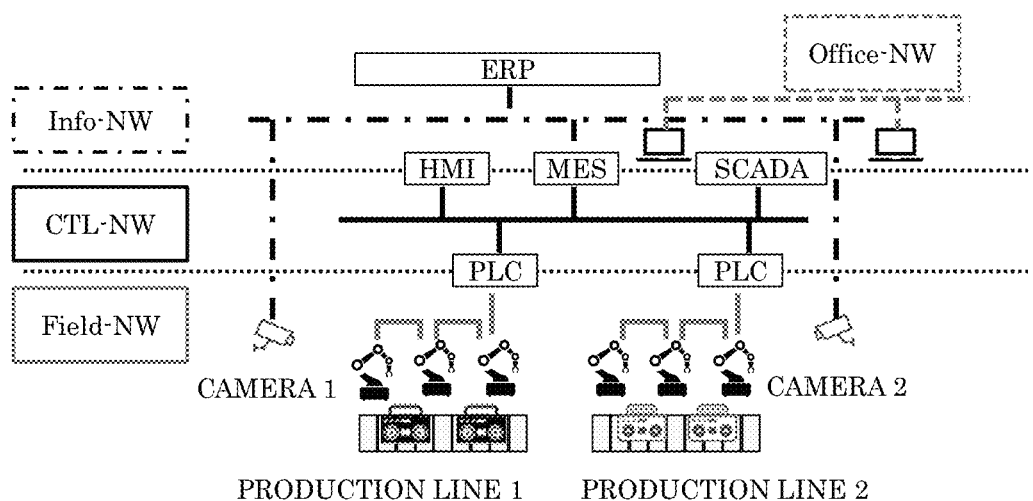
FIG. 1 is a diagram showing an example of a case in which a plurality of networks having a different service level are each a wired network.
Figure 2:
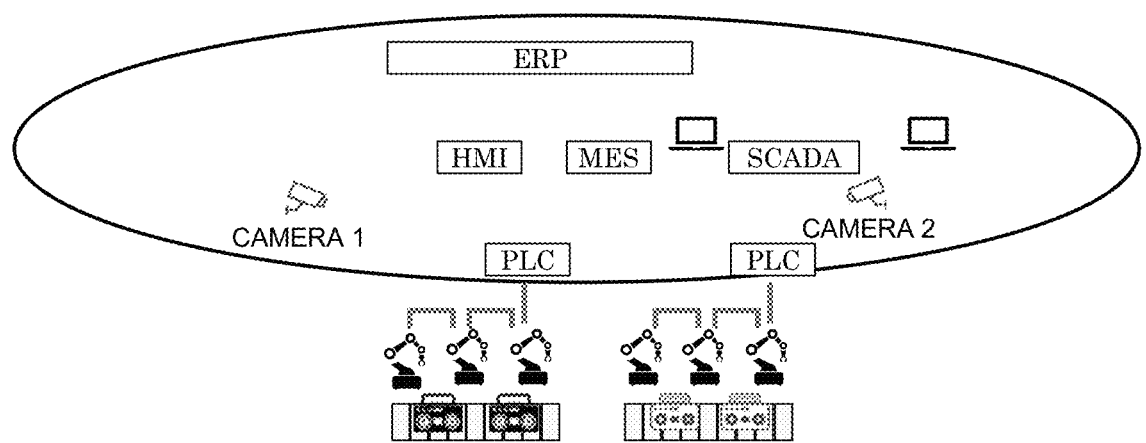
FIG. 2 is a diagram showing an example of a case where certain networks in the case illustrated in FIG. 1 have been changed to a wireless network.

In the following explanation, "interface device" may be one or more interface devices. The one or more interface devices may be at least one of the following.

(1) One or more I/O (Input/Output) interface devices. An I/O (Input/Output) interface device is an interface device for at least either an I/O device or a remote display computer. An I/O interface device for a display computer may be a communication interface device. At least one I/O device may be a user interface device; for example, either an input device such as a keyboard or a pointing device, or an output device such as a display device.

(2) One or more communication interface devices. The one or more communication interface devices may be one or more communication interface devices of the same type (for instance, one or more NICs (Network Interface Cards)) or two or more communication interface devices of a different type (for instance, an NIC and an HBA (Host Bus Adapter)).

Moreover, in the following explanation, "memory" is one or more memory devices as an example of one or more storage devices, and typically may be a main storage device. At least one memory device among the memories may be a volatile memory device or a non-volatile memory device.

Moreover, in the following explanation, "permanent storage device" may be one or more permanent storage devices as an example of one or more storage devices. A permanent storage device typically may be a non-volatile storage device (for instance, an auxiliary storage device), and specifically may be, for example, an HDD (Hard Disk Drive), an SSD (Solid State Drive), an MVNE (Non-Volatile Memory Express) drive, or an SCM (Storage Class Memory).

Moreover, in the following explanation, "storage device" may be either a memory or a permanent storage device.

Moreover, in the following explanation, "processor" may be one or more processor devices. At least one processor device typically may be a microprocessor device such as a CPU (Central Processing Unit), but may also be a different type of processor device such as a GPU (Graphics Processing Unit). At least one processor device may be a single core processor device or a multi core processor device. At least one processor device may be a processor core. At least one processor device may also be a processor device, in the broad sense of the term, such as a circuit as an aggregate of gate arrays based on a hardware description language which performs a part or all of the processing (for instance, an FPGA (Field-Programmable Gate Array), a CPLD (Complex Programmable Logic Device) or an ASIC (Application Specific Integrated Circuit)).

Moreover, in the following explanation, an expression such as "xxx table" may be used to explain the information that is output in response to an input, but such information may be data of any type of structure (for instance, it may be structured data or non-structured data), or a learning model as represented by a neural network, a genetic algorithm or a random forest which generates an output in response to an input. Accordingly, "xxx table" can also be referred to as "xxx information". Moreover, in the following explanation, the configuration of the respective tables is merely an example, and one table may be divided into two or more tables, and all or a part of two or more tables may be one table.

Moreover, in the following explanation, an expression such as "yyy unit" may be used to explain a function, but a function may be realized by one or more computer programs being executed by a processor, or realized with one or more hardware circuits (for instance, an FPGA or an ASIC), or realized based on a combination thereof. When a function is realized by a program being executed by a processor, since predetermined processing is performed by using a storage device and/or an interface device as appropriate, the function may also be deemed to be at least a part of the processor. Processing that is explained with a function as the subject may also be processing that is performed by a processor or a device comprising such processor. A program may also be installed from a program source. A program source may be, for example, a program distribution computer or a computer-readable recording medium (for instance, a non-transitory recording medium). The explanation of the respective functions is merely an example, and a plurality of functions may be consolidated into one function, or one function may be divided into a plurality of functions.

Moreover, in the following explanation, when the same type of elements are explained without differentiation, a common mark within the reference mark will be used, and when the same type of elements are to be differentiated, the reference mark may be used.

Moreover, as information for identifying elements such as "QoS class" and "address", arbitrary information (for instance, at least one among "identifying information", "identifier", "name", "ID" and "number") may be adopted. Several embodiments are now explained. An LTE network is taken as an example in the following embodiment.

First Embodiment

Figure 3:
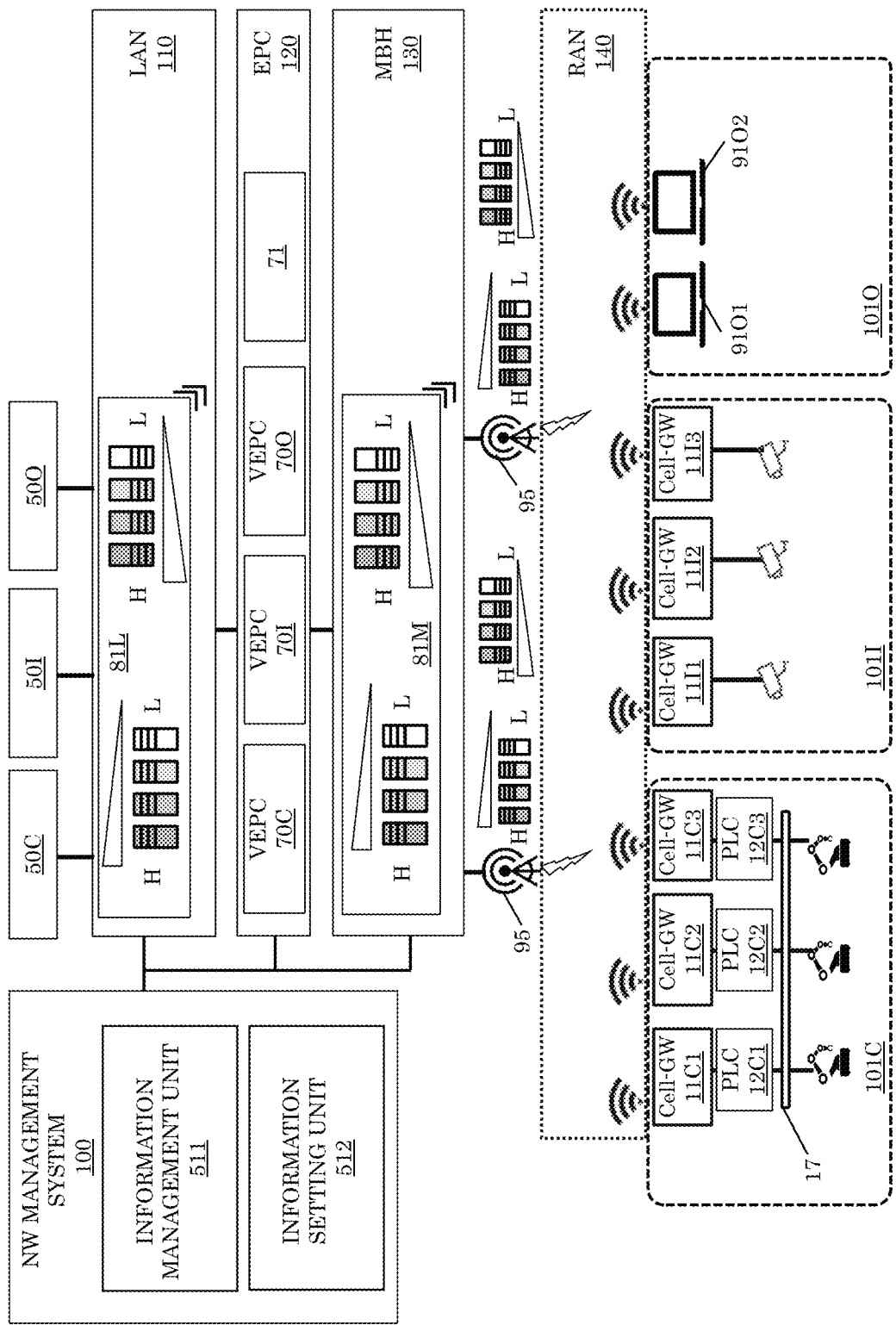
FIG. 3 is a diagram showing a configuration example of the overall system according to the first embodiment.

FIG. 3 is a diagram showing a configuration example of the overall system according to the first embodiment.

In this embodiment, an example of a first device is a UE (User Equipment), and an example of a second device is a server 50. An example of the UE is a Cell-GW 11 or an office PC 91. "Cell-GW" is the abbreviation of "Cellular Gateway", and is a device which engages in wireless communication with a base station 95. The office PC 91 is a PC installed in an office inside the factory or outside the factory. The server 50 is a server such as an application server or a Web server, and is an example of a destination or a source in the communication with the UE (or a device as one end of the communication via the UE). The base station 95 may also be referred to as an eNB (evolved Node B) (gNB (next generation Node B) in 5G).

For each service level, a service segment 101 and a QoS class corresponding to that service level are defined.

As the QoS class, there are "High", "Middle" and "Low" as the so-called priority. Note that, in FIG. 3, since there are three segments 101, the QoS class consists of the three levels of "High", "Middle" and "Low", and the number of levels of the QoS class may be the same as the number of segments 101. Moreover, the QoS class may be one expression example of the service level. In other words, the QoS class may be included in the service level.

Affiliated with the service segment 101 is an element for which communication satisfying the service level (QoS class) corresponding to the service segment 101 is desired. As the element, there is at least the UE (in this example, the Cell-GW 11 or the office PC 91), and the server 50 may also be an example of the element of the service segment 101. In this embodiment, as examples of the service level, there are "CTL-NW", "Info-NW" and "Office-NW". Accordingly, as the service segments 101, there are a CTL-NW segment 101C, an Info-NW segment 101I and an Office-NW segment 101O. As the UE, there are a Cell-GW 11C belonging to the CTL-NW segment 101C, a Cell-GW 11I belonging to the Info-NW segment 101I, and an office PC 91O belonging to the Office-NW segment 101O. As the servers 50, there are a server 50C belonging to the CTL-NW segment 101C, a server 50I belonging to the Info-NW segment 101I, and a server 50O belonging to the Office-NW segment 101O. Note that the respective service levels of "CTL-NW", "Info-NW" and "Office-NW" follow one or more types of requirements as the service level. Moreover, while the Cell-GW 11C belonging to the CTL-NW segment 101C communicates with a PCL 12C which controls industrial equipment, the Cell-GW 11C and the PLC 12C are connected, for example, via the Ethernet (registered trademark).

Packets that are sent and received in the mobile communication between the UE and the server 50 pass through an EPC (Evolved Packet Core) 120, an MBH (Mobile Back Haul) 130 and a LAN (Local Area Network) 110. The EPC 120, the MBH 130 and the LAN 110 are each an example of a communication system. The communication system is a system configured from one or more communication devices. In this embodiment, "communication device" means a device as a component of the communication system. Information setting in the communication device of the communication system may be performed, for example, from a network management system 100 via a console of the communication device.

The EPC 120 is an example of a core network as a third communication system. In this embodiment, since an LTE is taken as an example as described above, the core network is the EPC 120. When 5G is taken as an example, the core network may be a 5G core network.

The MBH 130 is an example of a first communication system (communication system as a network which connects the core network and one or more base stations which engage in wireless communication with a plurality of first devices) and, for example, may be a network including a plurality of equipment of the MNO, or a network constructed by a user. The packets that are sent and received in the communication between a plurality of base stations 95 and the EPC 120 pass through the MBH 130. Note that the packets that are sent and received in the communication between the base station 95 and the UE pass through a RAN (Radio Access Network) 140.

The LAN 110 is an example of a second communication system (communication system as a network which connects the core network and a plurality of second devices). The packets that are sent or received in the communication between a plurality of servers 50 and the EPC 120 pass through the LAN 110.

Constructed is the network management system 100 which manages, in an integrated manner, the EPC 120, the MBH 130 and the LAN 110. While the network management system 100 may be a computer system comprising one or more physical computers, a different type of system, for example, a system (for instance, a cloud computing system) realized on a physical calculation resource group (for instance, a cloud platform) may also be adopted in substitute for the foregoing calculation system.

Figure 4:
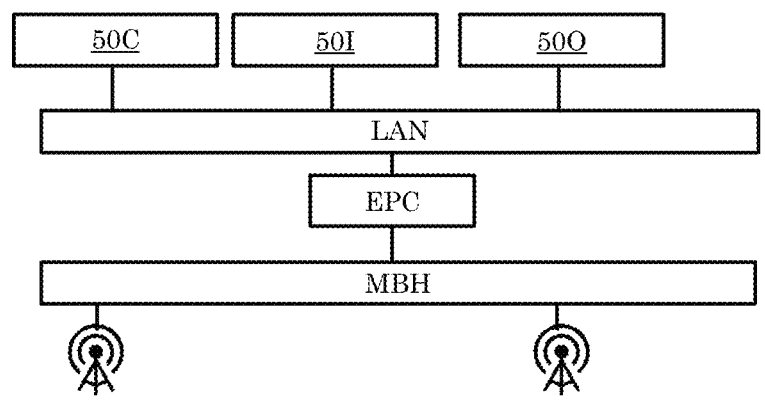
FIG. 4 is a diagram showing a comparative example of the first embodiment.

The network management system 100 includes an information management unit 511 and an information setting unit 512. The information management unit 511 manages a management table for each of the MBH 130, the EPC 120 and the LAN 110. The information setting unit 512 performs information setting to the MBH 130, the EPC 120 and the LAN 110 for logically dividing a communication system group, which includes the MBH 130, the EPC 120 and the LAN 110, based on the management table of each of the MBH 130, the EPC 120 and the LAN 110. For each of a plurality of different QoS classes, realized are the logical partitions passed through by the packets that are sent and received in the mobile communication between the UE and the server 50 belonging to the service level associated with that QoS class based on the information set in the foregoing information setting. A logical partition extends across the MBH 130, the EPC 120 and the LAN 110. For example, the packets that are sent and received between the Cell-GW 11C belonging to the CTL-NW segment 101C and the server 50C pass through a logical partition corresponding to the QoS class associated with the service level of "CTL-NW", and do not pass through any logical partition other than the foregoing logical partition. It is thereby possible to avoid the packets having a different service level coexisting in the same logical partition, and consequently maintain the service level of the communication of the UE and the server 50 at the service level corresponding to the service segment 101 to which the UE and the server 50 belong. If the UE and the server 50 are deemed to be one end and the other end of the communication, the network management system 100 can logically divide, End to End, the communication system group including the MBH 130, the EPC 120 and the LAN 110. Note that, according to the comparative example illustrated in FIG. 4, since the CTL-NW, the Info-NW and the Office-NW become flat in the MBH and the LAN as a result of becoming unwired, the packets having a plurality of different service levels of "CTL-NW", "Info-NW" and "Office-NW" will coexist. In this embodiment, it is possible to avoid the coexistence that occurs in the comparative example illustrated in FIG. 4. Moreover, with regard to the CTL-NW segment 101C illustrated in FIG. 3, as described later, information (for instance, QCI) is set in the Cell-GW 11C. Thus, a QoS of End to End can be provided even in the communication from a device in which a QoS or a QCI cannot be designated (for instance, a device in the factory such as the PLC 12C).

The information setting unit 512 sets, in the EPC 120, a plurality of VEPCs (Virtual EPCs) 70 each corresponding to a plurality of different service levels based on the management table of the EPC 120. The VEPC 70 is an example of a virtual third communication system. The VEPC 70 relays the packets that are sent and received between the UE and the server 50 in the service segment 101 associated with the logical partition (specifically, logical partition which corresponds to the QoS class associated with the service level corresponding to that VEPC 70) corresponding to that VEPC 70. In other words, the EPC 120 is logically divided into a plurality of parts each corresponding to a plurality of service levels. Accordingly, the existence of a VEPC 70 for each service level (service segment 101) will contribute to avoiding the coexistence of packets having a different service level. Each VEPC 70 may be one element of the logical partition corresponding to that VEPC 70. Assigned to each VEPC 70 is an APN (Access Point Name) as an example of an identifier of that VEPC 70. According to the example shown in FIG. 3, provided are a VEPC 70C corresponding to the CTL-NW segment 101C, a VEPC 70I corresponding to the Info-NW segment 101I, and a VEPC 70O corresponding to the Office-NW segment 101O.

The information setting unit 512 sets, in the MBH 130 (specifically, each communication device 81M configuring the MBH 130), a plurality of priority queues each corresponding to a plurality of service levels for each of an upstream flow (flow of communication to the server 50 side) and a downstream flow (flow of communication to the UE side) based on the management table of the MBH 130. Moreover, the information setting unit 512 sets, in the LAN 110 (specifically, each communication device 81L configuring the LAN 110), a plurality of priority queues each corresponding to a plurality of service levels for each of the upstream flow and the downstream flow based on the management table of the LAN 110. A packet is sorted to a priority queue corresponding to the QoS class of that packet in both the upstream flow and the downstream flow. In other words, the MBH 130 and the LAN 110 are each logically divided into a plurality of parts each corresponding to a plurality of service levels. Accordingly, this kind of priority queue setting contributes to avoiding the coexistence of packets having a different service level.

In this embodiment, the EPC 120 performs information setting to each base station 95 based on information that was set by the information setting unit 512 in the EPC 120. For example, the EPC 120 may set, in each base station 95, the respective IDs of the UE and the server 50 associated with the QoS class for each of a plurality of QoS classes (plurality of service levels). According to this setting, each base station may set, for each of the upstream flow and the downstream flow, a plurality of priority queues each corresponding to a plurality of QoS classes (plurality of service levels). When the base station receives a packet, the base station sorts that packet to a priority queue corresponding to the QoS class to which the source or the destination of that packet belongs. Consequently, the coexistence of packets having a different service level is avoided also in the base station 95. Note that, in substitute for the EPC 120, in which information (information based on the relay control of the packet) has been set from the information setting unit 512, setting information in the base station 95, the information setting unit 512 may also set information (information based on the relay control of the packet) in the base station 95. Moreover, the information setting unit 512 may also set information (information based on the relay control of the packet) in a device which does not belong to any of the MBH 130, the EPC 120 and the LAN 110 and which is related to the sending and receiving of the packet. For each QoS class, a logical partition corresponding to that QoS class may include a priority queue corresponding to that QoS class.

The EPC 120 may also include a control signal processing function (for instance, an MME (Mobility Management Entity), a PCRF (Policy and Charging Rule control Function)) of processing control signals to the EPC 120. Thus, the information setting unit 512 may set in each communication device 81, in addition to a plurality of priority queues each corresponding to a plurality of service levels, a priority queue for storing the control signals sent and received based on the control signal processing function (hereinafter referred to as the "control signal queue") for both the upstream flow and the downstream flow. The control signal queue may be set in each base station 95 for each of the upstream flow and the downstream flow. The control signal queue may be a priority queue of a priority that is higher than the plurality of priority queues each corresponding to the plurality of service levels.

Figure 5:
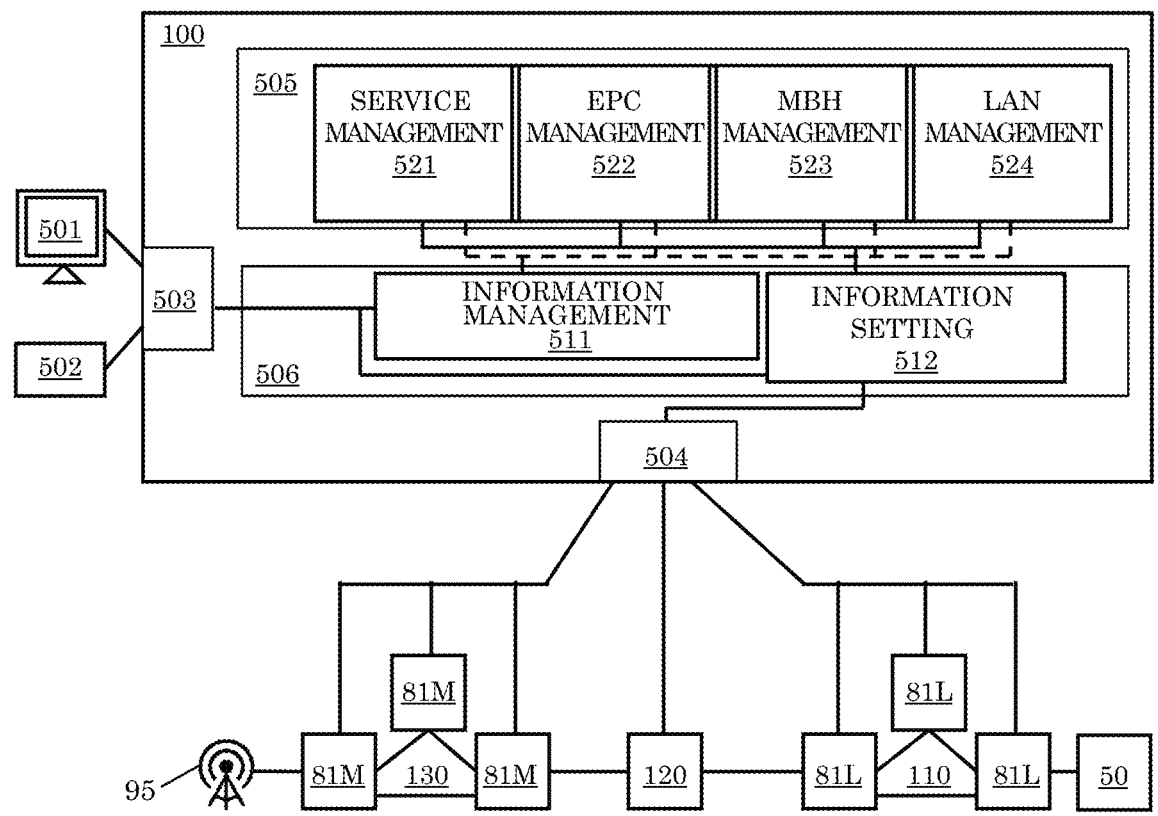
FIG. 5 is a diagram showing a configuration example of the network management system.

FIG. 5 is a diagram showing a configuration example of the network management system 100.

The network management system 100 includes interface devices (for instance, first and second interface devices 503 and 504), a storage device 505, and a processor 506 connected thereto.

The first interface device 503 is an interface device for an input/output device such as a display device 501 and an input device 502 (for instance, a keyboard or a pointing device).

The second interface device 504 is an interface device for each communication device 81 (for instance, each communication device 81M in the MBH 130, each communication device in the EPC 120, and each communication device in the LAN 110).

The storage device 505 stores various types of information and programs. As examples of the information stored in the storage device 505, there are a service management table 521, an EPC management table 522, an MBH management table 523 and a LAN management table 524.

The information management unit 511 and the information setting unit 512 described above are realized as a result of the one or more programs stored in the storage device 505 being executed by the processor 506.

Specifically, for example, the information management unit 511, for each of the MBH 130, the EPC 120 and the LAN 110, receives information via a user interface for receiving information to be included in the management table of the communication system, and includes, in the management table, information input via the user interface and received through the first interface device 503. For example, the user interface may be a GUI (Graphical User Interface) or a CLI (Command Line Interface). As a result of receiving the input of information from the user regarding a predetermined type of information item in the management table and reflecting the input information in the management table, it is possible to realize the logical division of End to End.

Moreover, for example, the information setting unit 512 performs information setting to the EPC 120 based on the EPC management table 522 via the second interface device 504, performs information setting based on the MBH management table 523 to each communication device 81M in the MBH 130, and performs information setting based on the LAN management table 524 to each communication device 81L in the LAN 140.

Figure 6:
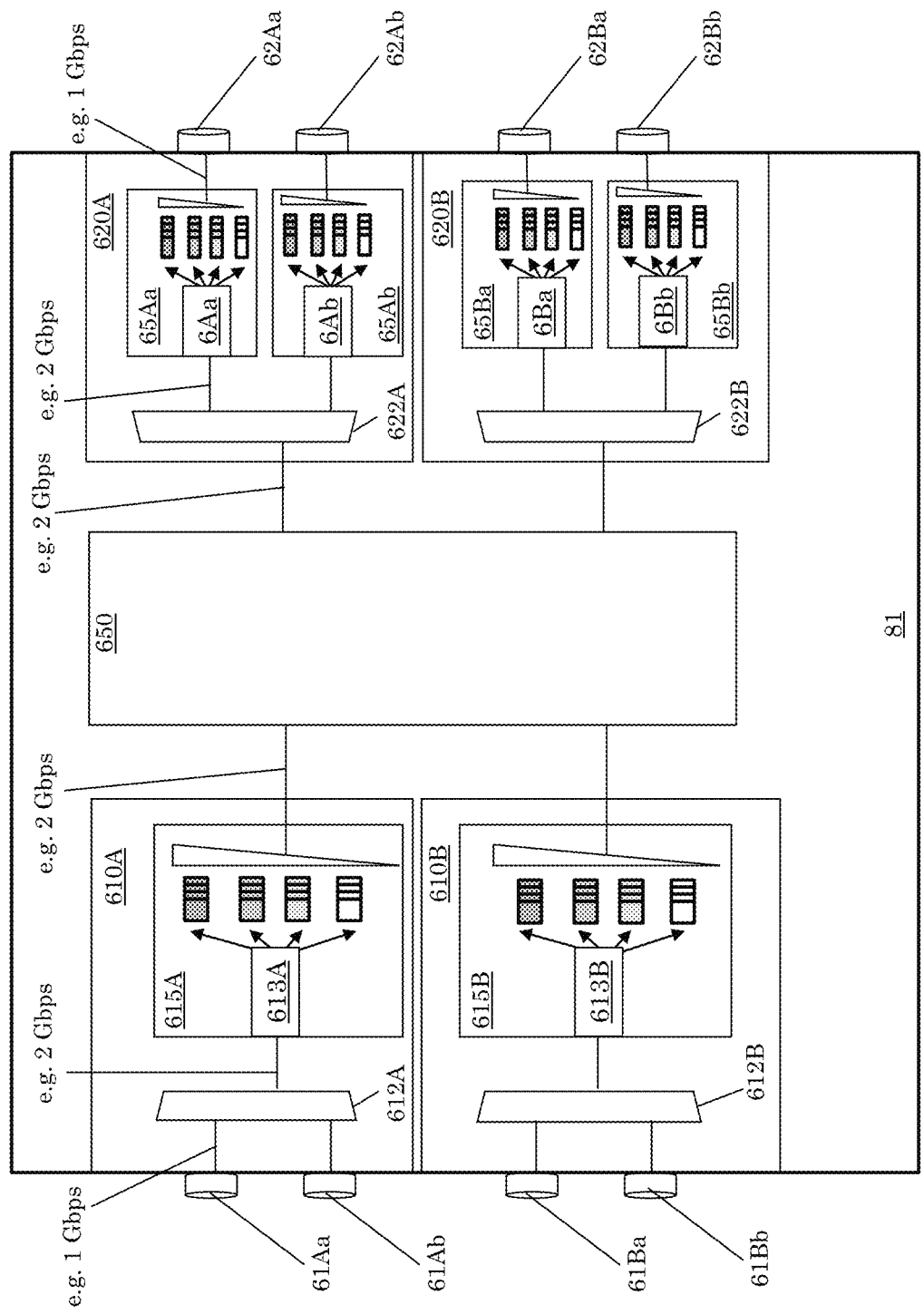
FIG. 6 is a diagram showing a configuration example of the communication device according to the first embodiment.

FIG. 6 is a diagram showing a configuration example of the communication device 81 in this embodiment.

The communication device 81 includes an input interface device 610, an output interface device 620, and a switch fabric 650 connected thereto. The communication device 81 illustrated in FIG. 6 includes two input interface devices 610A and 610B, and two output interface devices 620A and 620B. The switch fabric 650 performs routing control between the input interface devices 610A and 610B and the output interface devices 620A and 620B.

Of the input interface devices 610A and 610B, the input interface device 610A is taken as an example. The input interface device 610A includes a plurality of input ports 61A (for instance, two input ports 61Aa and 61Ab), a packet multiplexing unit 612 which multiplexes a packet input via the input port 61A on an internal transmission path, and an input buffer 615A which temporarily stores the packet multiplexed by the packet multiplexing unit 612. The input buffer 615A includes a plurality of priority queues (a plurality of logical queues each corresponding to a plurality of different QoS classes (plurality of priorities)) which follow the information set by the network management system 100, and an internal buffer distribution unit 613A which sorts the packet to one of the plurality of priority queues.

Of the output interface devices 620A and 620B, the output interface device 620A is taken as an example. The output interface device 620A includes a plurality of output ports 62A (for instance, two output ports 62Aa and 62Ab), a plurality of output buffers 65A (for instance, two output buffers 65Aa and 65Ab) each corresponding to the plurality of output ports 62A, and a packet distribution unit 622A which sorts a packet output from the switch fabric 650 to one of the plurality of output buffers 65A. Of the output buffers 65Aa and 65Ab, the output buffer 65A is taken as an example. The output buffer 65Aa temporarily stores a packet. Specifically, for example, the output buffer 65Aa includes a plurality of priority queues which follow the information set by the network management system 100, and an internal buffer distribution unit 6Aa which sorts the packet to one of the plurality of priority queues.

Priority control (control of sorting the packet to the priority queue corresponding to the QoS class identified from that packet) is performed in both the packet distribution to the priority queue in the input buffer 615 and the packet distribution to the priority queue in the output buffer 65.

For example, when a packet is input to the communication device 81 via the input port 61Aa, the packet multiplexing unit 612A multiplexes that packet on an internal transmission path. Here, the internal transmission rate becomes double the transmission rate of the input port 61Aa. For example, as shown in FIG. 6, when the transmission rate of the input port 61Aa is 1 Gbps (1 gigabyte/second), the internal transmission rate becomes 2 Gbps. The internal buffer distribution unit 613A of the input buffer 615A performs priority control, specifically, for example, identifies the address and the QoS class based on the information in the header field of the buffer, and sorts the packet to the priority queue corresponding to the identified QoS class. The reason why this priority control is performed, for example, is as follows. In other words, since the switch output is 2 Gbps while the switch input is N-times (N is the number of input interface devices 610) 2 Gbps, when a transmission request is simultaneously received from N-number of input interface devices 610, by performing control of reading the packets from the priority queue in descending order of the QoS class (priority), it is possible to suppress the priority packet (packet having a high QoS class) from being delayed in the communication device 81.

A packet read from the priority queue of the input interface device 610A is sorted by the switch fabric 650 to the output interface device 620 corresponding to the identified address of the packet. For example, let it be assumed that a packet is sorted by the output interface device 620A. The packet distribution unit 622A sorts the packet to the output buffer 65A corresponding to the identified address of the packet. For example, let it be assumed that the packet is sorted by the output buffer 65Aa. The internal buffer distribution unit 6Aa sorts the packet to the priority queue corresponding to the QoS class of the packet. With the output buffer 65Aa, rate conversion from the internal transmission rate (2 Gbps) to the transmission rate (1 Gbps) of the output port 62A is performed. The reason why priority control is performed in the output buffer 65Aa, for example, is as follows. In other words, since the internal transmission rate is fast in comparison to the transmission rate of the output port 62A, there may be cases where packets exceeding the output port processing performance are transferred from the switch fabric 650. Here, by sequentially transferring packets in order from those having a high priority, it is possible to suppress the priority packet from being delayed in the communication device 81.

Figure 7:
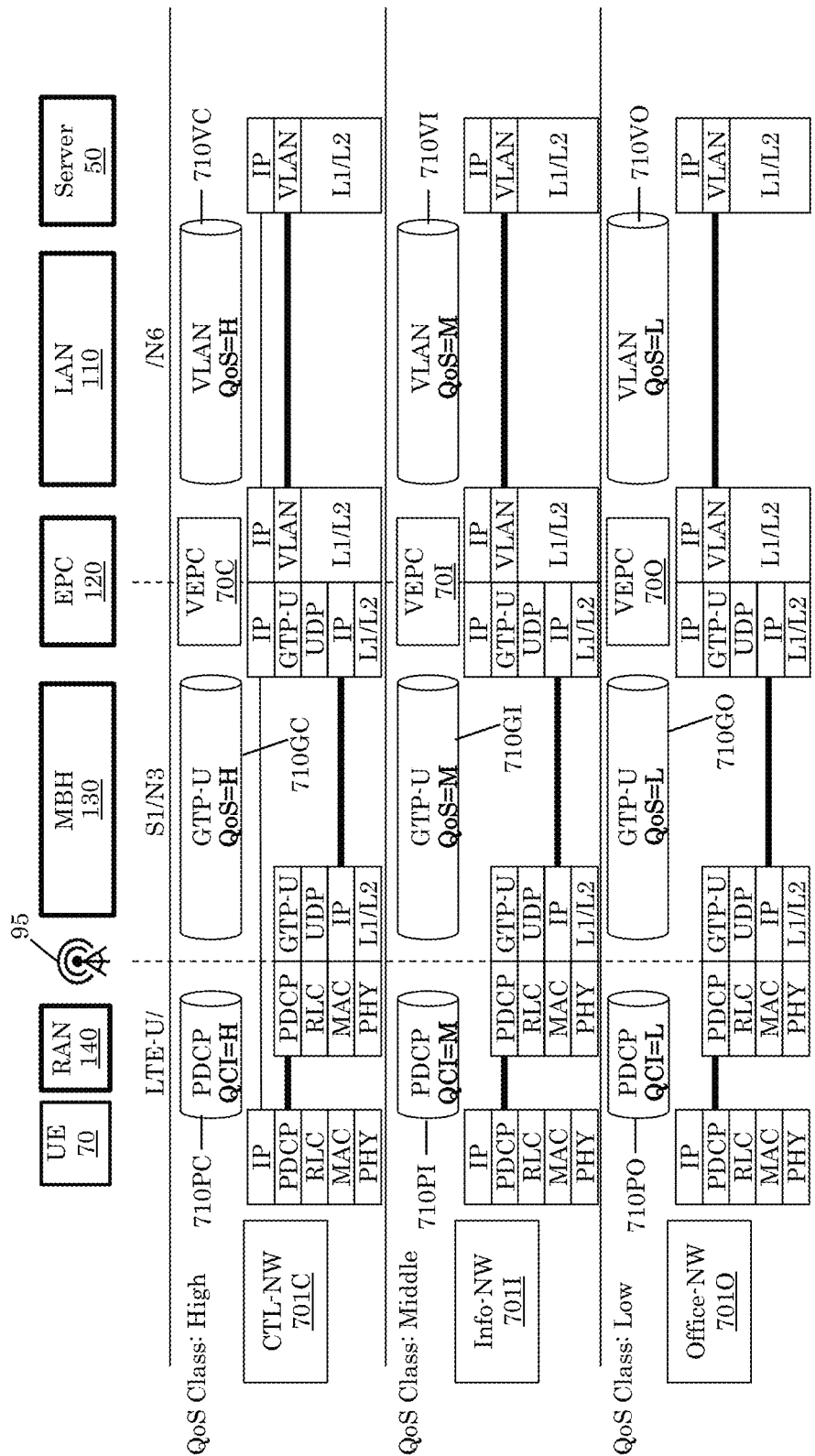
FIG. 7 is a diagram showing an example of the communication for each service level.

FIG. 7 is a diagram showing an example of the communication for each service level.

A logical partition 701 is realized for each of a plurality of service levels of "CTL-NW", "Info-NW" and "Office-NW". Specifically, respectively realized are a logical partition 701C corresponding to the service level of "CTL-NW", a logical partition 701I corresponding to the service level of "Info-NW", and a logical partition 701O corresponding to the service level of "Office-NW". The QoS class of "High" is associated with the service level of "CTL-NW", the QoS class of "Middle" is associated with the service level of "Info-NW", and the QoS class of "Low" is associated with the service level of "Office-NW". The correspondence relation of the service level and the QoS class is defined, for example, by the user via the user interface provided from the network management system 100.

In FIG. 7, the broken line that extends across the logical partitions 701C, 701I and 701O for each of the base station 95 and the EPC 120 means that the used communication protocol will be switched. Moreover, FIG. 7 shows a protocol stack for each of the UE 70, the base station 95, the EPC 120 and the server 50. In the communication via the RAN 140 between the UE 70 (Cell-GW 11 or office PC 91 in this embodiment) and the base station 95, a bearer 710P (bearer for communication based on a PDCP (Packet Data Convergence Protocol)) is established, and packets are sent and received via the bearer 710P. In the communication via the MBH 130 between the base station 95 and the VEPC 70, a bearer 710G (bearer for communication based on a GTP-U (GPRS Tunneling Protocol for User plane)) is established, and packets are sent and received via the bearer 710G. In the communication via the LAN 110 between the VEPC 70 and the server 50, a bearer 710V (bearer for communication based on a VLAN) is established, and packets are sent and received via the bearer 710V. A "bearer" is a logical packet communication path. For each QoS class, the logical partition 701 includes the priority queue and the VEPC 70 as described above, and also logically includes the bearer 710 corresponding to that QoS class. Consequently, communication of a quality corresponding to the QoS class is ensured End to End. The term "quality" referred to herein may mean the packet loss ratio and the transfer delay time.

In this embodiment, the EPC 120 is unable to perform information setting to each communication device 81M configuring the MBH 130, and information setting to each communication device 81M configuring the MBH 130 is performed by the network management system 100 which manages, in an integrated manner, the MBH 130, the EPC 120 and the LAN 110. With regard to the base station 95, information representing the correspondence relation of the APN, the QCI and the QoS class is set from the network management system 100 or the EPC 120 via the MBH 130 in which information has been set by the network management system 100. In the UE 70, the APN of the VEPC 70 corresponding to the service segment 101 to which that UE 70 belongs, the QCI (QoS Class Identifier), and the value of the flow identifier corresponding to that service segment (that APN) are set from the EPC 120. A management table (not shown) representing the correspondence relation of the QCI and the QoS class may also be stored in the storage device 505 of the network management system 100, and the construction of a part among the management tables 521 to 524 and the setting of certain information to at least one among the MBH 130, the EPC 120 and the LAN 110 may also be realized based on the management table. The correspondence relation of the QCI and the QoS class, for example, may be based on data prescribed in a document of data (for instance, a 3GPP (Third Generation Partnership Project)) representing the prescription of the QCI, and such data may also be stored in the storage device 505 of the network management system 100. Moreover, as the types of "flow identifier", in this embodiment, there are an IP address, a DSCP (Differentiated Services Code Point), and a VLAN as described later.

For each logical partition 701, an ID (value of the flow identifier) is taken over by a plurality of sections such as the RAN 140, the MBH 130 and the LAN 110. A case in which the UE 70 is the Cell-GW 11C of the CTL-NW segment 101C is taken as an example. Thus, a packet sent from the Cell-GW 11C reaches the server 50C via the logical partition 701C. Specifically, for example, this is as follows.

(1) As a result of the Attach which notified the APN of the VEPC 70C being performed by the Cell-GW 11C, the bearer 710PC in the RAN 140 and the bearer 710GC in the MBH 130 are established. The bearer 710PC is a bearer of the communication performance which follows the QCI associated with the API of the VEPC 70C. The bearer 710GC is a bearer of the communication performance which follows the QoS class corresponding to that QCI.

(2) The base station 95 to which a packet was sent from the Cell-GW 11C via the bearer 710PC receives that packet. This communication is communication based on a PDCP. A value of the flow identifier is described in the PDCP header of the packet.

(3) The packet is relayed from the base station 95 to the VEPC 70C. Packet transmission from the base station 95 via the bearer 710GC is performed based on a GTP-U in substitute for the PDCP. In the relay of the packet, the value of the flow identifier described in the PDCP header of the packet sent based on the PDCP is taken over by the IP header of the packet sent based on the GTP-U. The packet having the IP header in which the value of the flow identifier has been described is sent from the base station 95 to the VEPC 70C.

(4) The packet is relayed from the VEPC 70C to the server 50C. Packet transmission from the VEPC 70C via the bearer 710VC is performed based on a VLAN in substitute for the GTP-U. In the relay of the packet, the value of the QoS described in the IP header of the packet sent based on the GTP-U is taken over by the VLAN header of the packet sent based on the VLAN. The packet having the VLAN header in which the value of the QoS has been described is sent from the VEPC 70C to the server 50C.

The priority of communication regarding a plurality of sections such as the RAN 140, the MBH 130 and the LAN 110 is CTL-NW>Info-NW>Office-NW, and these sections are logically divided as follows.

(1) The RAN 140 is logically divided in the following manner. In other words, for each VEPC 70 (APN), a QCI corresponding to that VEPC 70 is adopted. The RAN 140 is thereby logically divided according to a plurality of QoS classes.

(2) The MBH 130 is logically divided, for example, in the following manner. In other words, since the DIP (destination IP address) differs for each VEPC 70 (APN) in relation to the upstream flow, the QoS policy for identifying the upstream flow using the DIP is set in the communication device 81M (for instance, an L2 switch or an L3 switch). A priority queue according to the QoS class is realized in the communication device 81M. Meanwhile, since the SIP (source IP address) differs for each VEPC 70 (APN) in relation to the downstream flow, the QoS policy for identifying the downstream flow using the SIP is set in the communication device 81M (for instance, an L2 switch or an L3 switch). A priority queue according to the QoS class is realized in the communication device 81M. Moreover, the value of a field in which a priority is added to the packet, such as with the DSCP of the IP header, is changed for each VEPC 70 (APN), and the QoS policy for identifying the QoS of the flow from the DSCP value is set in the communication device 81M (for instance, an L2 switch or an L3 switch). A priority queue according to the QoS class may also be realized in the communication device 81M. Moreover, for example, the setting of the VLAN is changed for each VEPC 70 (APN), and the QoS policy for identifying the QoS of the flow from the VLAN value is set in the communication device 81M (for instance, an L2 switch or an L3 switch). A priority queue according to the QoS class may also be realized in the communication device 81M. The MBH 130 can thereby be logically divided and can have a plurality of QoS classes.

(3) The LAN 110 is logically divided, for example, in the following manner. In other words, the setting of the VLAN is changed for each VEPC 70 (APN), and the QoS policy for identifying the QoS of the flow from the VLAN value is set in the communication device 81L (for instance, an L2 switch or an L3 switch). Information setting is performed for each VEPC 70 (APN) regarding each of an L2 level and an L3 level. The setting in the L2 level is the setting of the value of the VLAN. The setting in the L3 level is the setting of the value of the IP address. Moreover, for example, since the DIP (destination IP address) differs for each server 50 in relation to the upstream flow, the QoS policy for identifying the upstream flow using the DIP is set in the communication device 81L (for instance, an L2 switch or an L3 switch). A priority queue according to the QoS class is realized in the communication device 81L. Meanwhile, since the SIP (source IP address) differs for each server 50 in relation to the downstream flow, the QoS policy for identifying the downstream flow using the SIP is set in the communication device 81L (for instance, an L2 switch or an L3 switch). A priority queue according to the QoS class may also be realized in the communication device 81L. The LAN 110 can thereby be logically divided and can have a plurality of QoS classes.

The logical partition 701 corresponding to the QoS class is based on information set using the management tables 521 to 524.

FIG. 8 is a diagram showing a configuration example of the service management table 521.

The service management table 521 has entries for each service level. Each entry holds information such as an entry ID 801, a service level name 802, a RAN priority setting 803, an MBH priority setting 804 and a LAN priority setting 805. One service level is now taken as an example (this is hereinafter referred to as the "target service level" in the explanation of FIG. 8).

The entry ID 801 represents the ID of the entry corresponding to the target service level. The service level name 802 represents the name of the target service level.

The RAN priority setting 803 represents the priority in the RAN 140. The MBH priority setting 804 represents the priority in the MBH 130. The LAN priority setting 805 represents the priority in the LAN 110. These priorities are synonymous with the QoS classes associated with the target service level.

While the service management table 521 is information used for creating the management tables 522 to 524 as described later, the service management table 521 may be omitted.

FIG. 9 is a diagram showing a configuration example of the EPC management table 522.

The EPC management table 522 exists for each flow identifier type available in the EPC 120. For example, there are an EPC management table 522A corresponding to the flow identifier type of "IP address", an EPC management table 522B corresponding to the flow identifier type of "DSCP", and an EPC management table 522C corresponding to the flow identifier type of "VLAN". Since the configuration of the EPC management tables 522A to 522C is the same, the EPC management table 522A is taken as an example.

The EPC management table 522A has entries for each QoS class (service level). Each entry holds information such as an entry ID 901A, a priority 902A, a flow identifier 903A, a value 904A, a VEPC name 905A, a QCI 906A and a SIM ID 907A. One QoS class is taken as an example (this is hereinafter referred to as the "target QoS class" in the explanation of FIG. 9).

The entry ID 901A represents the ID of the entry corresponding to the target QoS class. The priority 902A represents the priority as the target QoS class.

The flow identifier 903A represents the type of the flow identifier. The value 904A represents the flow identifier value corresponding to the target QoS class. The VEPC name 905A represents the name of the VEPC 70 corresponding to the target QoS class (service level with which the target QoS class is associated). The QCI 906A represents the value as the QCI corresponding to the target QoS class.

The SIM ID 907A represents the ID of each SIM card of one or more UE belonging to the service segment 101 with which the target QoS class is associated. A SIM card having the SIM ID 907A of "n" can be referred to as the "SIM card n" (n is a natural number).

According to the entry ID 901A of "1" illustrated in FIG. 9, the following applies. The VEPC name 905A of the VEPC 70A corresponding to the QoS class of "High" is "APN1", and the QCI 906A corresponding to the QoS class of "High" is "4". The value of the IP address in which the VEPC 70C is the destination or the source is "1". Moreover, five Cell-GWs 11C, each having the SIM cards 1 to 5, belong to the CTL-NW segment 101C with which the QoS class of "High" is associated.

According to the EPC management table 522B, the flow identifier type is "DSCP" and, therefore, the value 904B represents the DSCP value.

According to the EPC management table 522C, the flow identifier type is "VLAN" and, therefore, the value 904C represents the VLAN value (VID as the ID of the VLAN).

Figure 10:
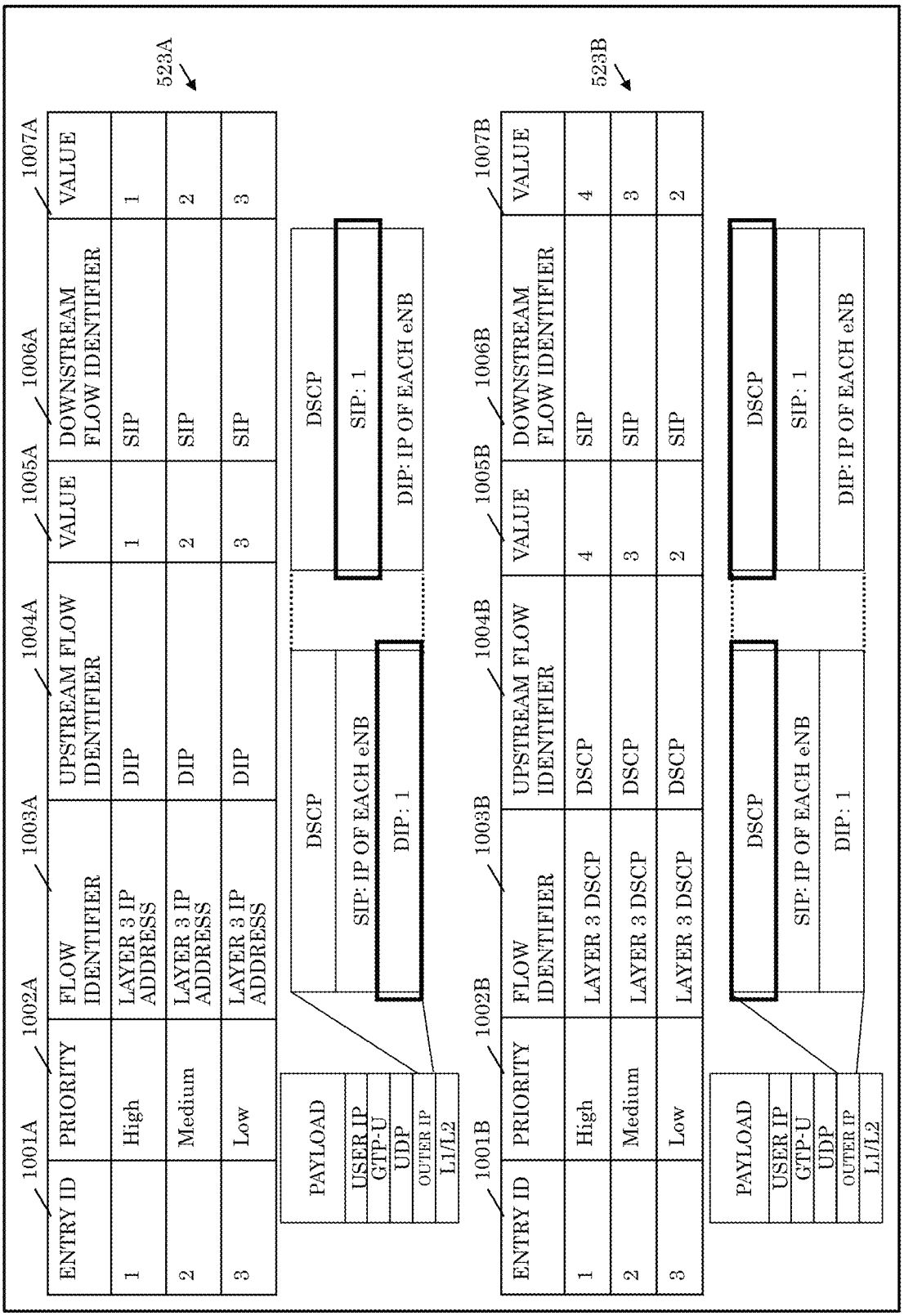
FIG. 10 is a diagram showing a configuration example of a part of the MBH management table according to the first embodiment.
Figure 11:
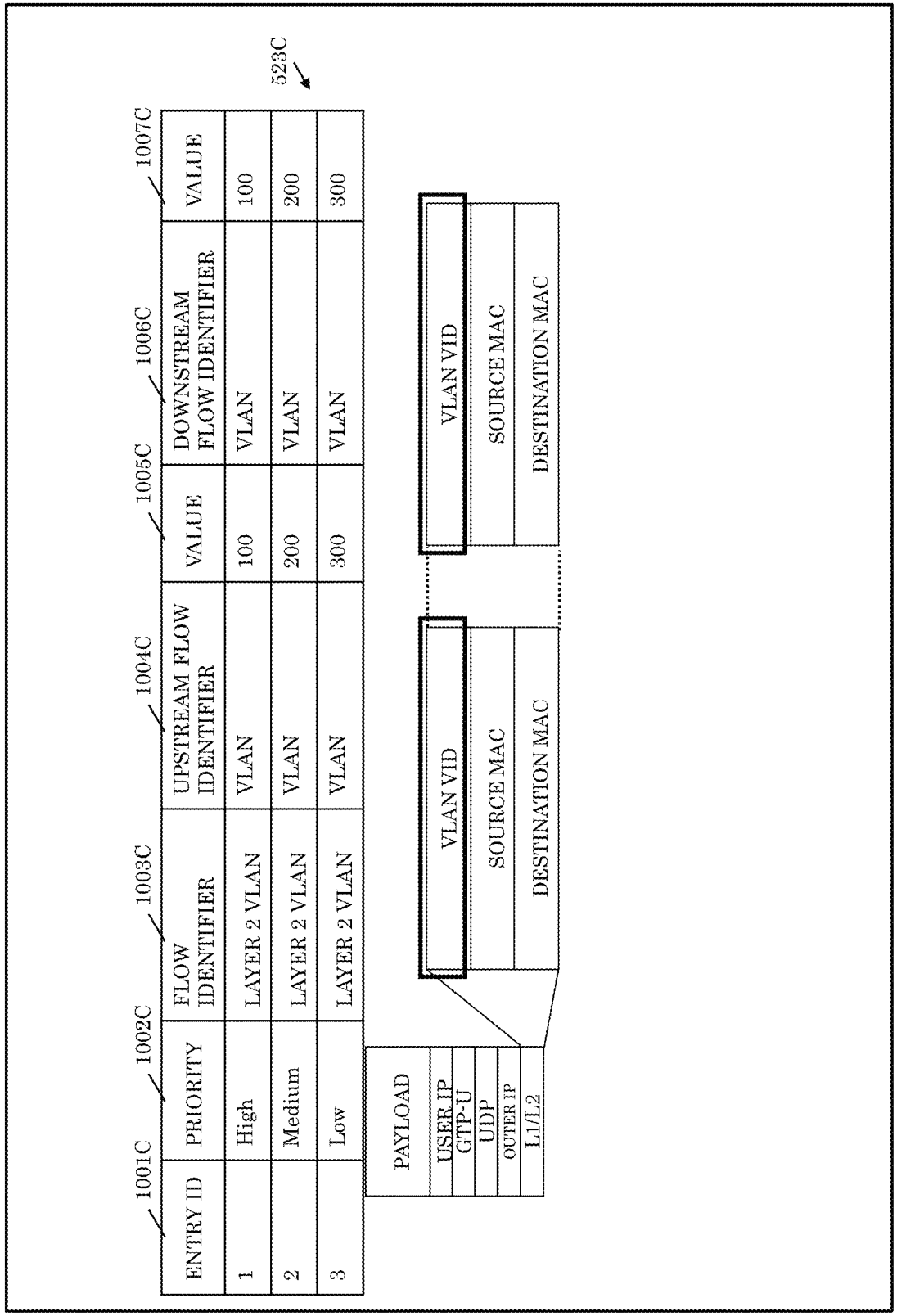
FIG. 11 is a diagram showing a configuration example of the remainder of the MBH management table according to the first embodiment.

FIG. 10 and FIG. 11 are diagrams showing a configuration example of the MBH management table 523.

The MBH management table 523 exists for each flow identifier type available in the MBH 130. For example, there are an MBH management table 523A corresponding to the flow identifier type of "IP address", an MBH management table 523B corresponding to the flow identifier type of "DSCP", and an MBH management table 523C corresponding to the flow identifier type of "VLAN". The MBH management tables 523A to 523C respectively form a pair with the EPC management tables 522A to 522C. Since the configuration of the MBH management tables 523A to 523C is the same, the EPC management table 523A is taken as an example.

The MBH management table 523A has entries for each QoS class (service level). Each entry holds information such as an entry ID 1001A, a priority 1002A, a flow identifier 1003A, an upstream flow identifier 1004A, a value 1005A, a downstream flow identifier 1006A and a value 1007A. One QoS class is taken as an example (this is hereinafter referred to as the "target QoS class" in the explanation of FIG. 10).

The entry ID 1001A represents the ID of the entry corresponding to the target QoS class. The priority 1002A represents the priority as the target QoS class. The flow identifier 1003A represents the type of the flow identifier.

The upstream flow identifier 1004A represents the type of the upstream flow identifier, and the value 1005A represents the value of the upstream flow identifier. The downstream flow identifier 1006A represents the type of the downstream flow identifier, and the value 1007A represents the value of the downstream flow identifier. An "upstream flow" is the flow of communication to the VEPC 70C side, and a "downstream flow" is the flow of communication to the UE side. In FIG. 10, the protocol stack illustrated below the MBH management table 523A represents the protocol stack in cases where the communication device 81M of the MBH 130 can identify the IP address information of the L3 (layer 3) and the identifier used for identifying the QoS. According to this example, in the upstream flow, an outer IP header (one example of the IP field) of the packet sent from the communication device includes, as the DIP (destination IP address), a value of the IP address of the VEPC 70C which is the destination of the packet. Moreover, in the downstream flow, an outer IP header of the packet received by the communication device includes, as the SIP (source IP address), a value of the IP address of the VEPC 70C as the source of the packet.

According to the MBH management table 523A, both the upstream flow and the downstream flow are separated with an IP address for each VEPC 70, and, with the MBH 130, the QoS class (service level) can be identified from the DIP regarding the upstream flow, and the QoS class (service level) can be identified from the SIP regarding the downstream flow. Accordingly, in a case where the communication device 81M of the MBH 130 is a communication device capable of identifying the IP address information of the L3 and both the upstream flow and the downstream flow can be separated with an IP address for each VEPC 70, the QoS in the MBH 130 can be maintained.

According to the MBH management table 523B, the flow identifier type is "DSCP" and, therefore, the values 1005B and 1007B both represent the DSCP value. In FIG. 10, the protocol stack illustrated below the MBH management table 523B represents the protocol stack in cases where the communication device 81M of the MBH 130 can identify the DSCP information of the L3 header and the identifier used for identifying the QoS. According to this example, in the upstream flow, an outer IP header of the packet sent from the communication device includes, as the DSCP value, a value of the priority of the packet. Moreover, in the downstream flow, an outer IP header of the packet received by the communication device includes, as the DSCP value, a value of the priority of the packet.

According to the MBH management table 523B, both the upstream flow and the downstream flow are separated with a DSCP value for each VEPC 70, and, with the MBH 130, the QoS class (service level) can be identified from the DSCP value regarding both the upstream flow and the downstream flow. Accordingly, in a case where the communication device 81M of the MBH 130 is a communication device capable of identifying the DSCP information and both the upstream flow and the downstream flow can be separated with a DSCP value for each VEPC 70, the QoS in the MBH 130 can be maintained.

As shown in FIG. 11, according to the MBH management table 523C, the flow identifier type is "VLAN" and, therefore, the values 1005C and 1007C both represent the VLAN value (VID as the ID of the VLAN). In FIG. 11, the protocol stack illustrated below the MBH management table 523C represents the protocol stack in cases where, in the MBH 130, a packet to which a VLAN tag of an L2 (level 2) has been assigned is sent and received between the eNB and the VEPC, and the communication device 81M can identify the VLAN tag information of the L2, and the identifier used for identifying the QoS. According to this example, in the upstream flow, an L2 header of the packet sent from the communication device includes, as the VLAN value, a value of the VLAN to which the VEPC 70C, as the destination of the packet, is connected. Moreover, in the downstream flow, an L2 header of the packet received by the communication device includes, as the VLAN value, a value of the VLAN to which the VEPC 70C, as the source of the packet, is connected.

According to the MBH management table 523C, both the upstream flow and the downstream flow are separated with a VLAN value for each VEPC 70, and, with the MBH 130, the QoS class (service level) can be identified from the VLAN value regarding both the upstream flow and the downstream flow. Accordingly, in a case where the communication device 81M of the MBH 130 is a communication device capable of identifying the VLAN value of the L2 and both the upstream flow and the downstream flow can be separated with a VLAN value for each VEPC 70, the QoS in the MBH 130 can be maintained.

Figure 12:
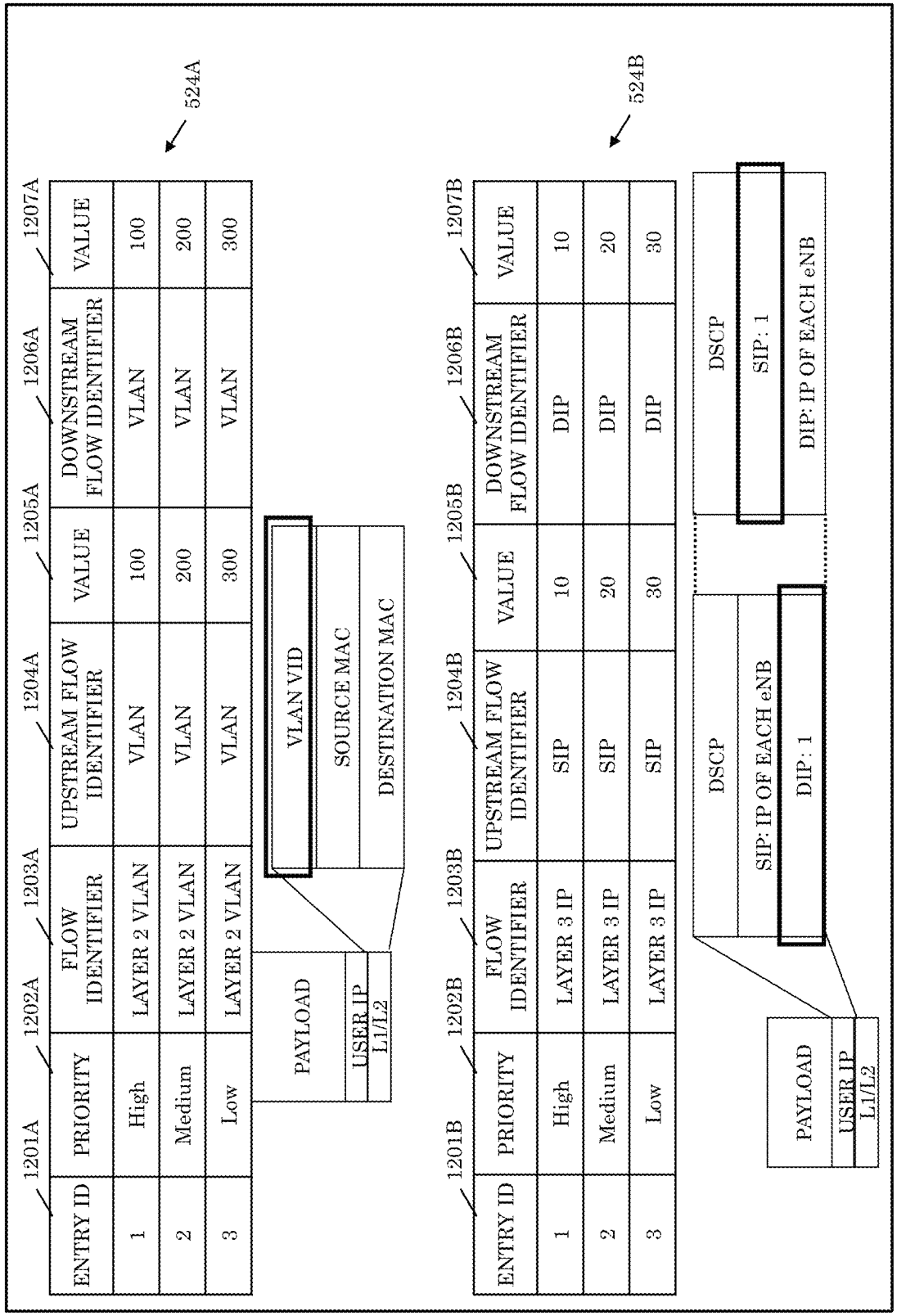
FIG. 12 is a diagram showing a configuration example of the LAN management table according to the first embodiment.

FIG. 12 is a diagram showing a configuration example of the LAN management table 524.

The LAN management table 524 exists for each flow identifier type available in the LAN 110. For example, there are a LAN management table 524A corresponding to the flow identifier type of "VLAN", and a LAN management table 524B corresponding to the flow identifier type of "IP address". According to FIG. 9 to FIG. 11, while there are three patterns as the pair of the EPC management table 522 and the MBH management table 523 (three flow identifier types of "IP address", "DSCP" and "VLAN"), the LAN management table 524 has two patterns. Thus, there are combinations in a total of six patterns.

Since the configuration of the LAN management tables 524A and 524B is the same, the LAN management table 524A is taken as an example.

The LAN management table 524A has entries for each QoS class (service level). Each entry holds information such as an entry ID 1201A, a priority 1202A, a flow identifier 1203A, an upstream flow identifier 1204A, a value 1205A, a downstream flow identifier 1206A and a value 1207A. One QoS class is taken as an example (this is hereinafter referred to as the "target QoS class" in the explanation of FIG. 12).

The entry ID 1201A represents the ID of the entry corresponding to the target QoS class. The priority 1202A represents the priority as the target QoS class. The flow identifier 1203A represents the type of the flow identifier. The upstream flow identifier 1204A represents the type of the upstream flow identifier, and the value 1205A represents the value of the upstream flow identifier. The downstream flow identifier 1206A represents the downstream flow identifier, and the value 1207A represents the value of the downstream flow identifier.

In FIG. 12, the protocol stack illustrated below the LAN management table 524A represents the protocol stack in cases where the communication device 81L of the LAN 110 can identify the VLAN tag information of the L2 and the identifier used for identifying the QoS. According to this example, in the upstream flow, an L2 header of the packet sent from the communication device 81L includes, as the VLAN value, a value of the VLAN to which the server 50C and the VEPC 70C as the destination of the packet are connected. Moreover, in the downstream flow, an L2 header of the packet received by the communication device 81L includes, as the VLAN value, a value of the VLAN to which the server 50C and the VEPC 70C are connected as the source of the packet.

According to the LAN management table 524A, a VLAN is provided for each VEPC 70, and, with the LAN 110, the QoS class (service level) can be identified from the VLAN value. Accordingly, in a case where the communication device 81L of the LAN 110 is a communication device capable of identifying the VLAN value of the L2 and both the upstream flow and the downstream flow can be separated with a VLAN value for each VEPC 70, the QoS in the LAN 110 can be maintained.

According to the LAN management table 524B, the flow identifier type is "IP address" and, therefore, the values 1205B and 1207B both represent the value of the IP address. In FIG. 12, the protocol stack illustrated below the LAN management table 524B represents the protocol stack in cases where the communication device 81L of the LAN 110 can identify the IP address information of the L3 and the identifier used for identifying the QoS. According to this example, in the upstream flow, an outer IP header of the packet sent from the communication device includes, as the DIP, a value of the IP address of the server 50C as the destination of the packet. Moreover, in the downstream flow, an outer IP header of the packet received by the L3 switch includes, as the SIP, a value of the IP address of the server 50C as the source of the packet.

According to the LAN management table 524B, both the upstream flow and the downstream flow are separated with an IP address for each VEPC 70, and, with the LAN 110, the QoS class (service level) can be identified from the DIP regarding the upstream flow, and the QoS class (service level) can be identified from the SIP regarding the downstream flow. Accordingly, in a case where the communication device 81L of the LAN 110 is a communication device capable of identifying the IP address information of the L3 and both the upstream flow and the downstream flow can be separated with an IP address for each VEPC 70, the QoS in the LAN 110 can be maintained.

Examples of the processing performed in this embodiment are now explained.

Figure 13:
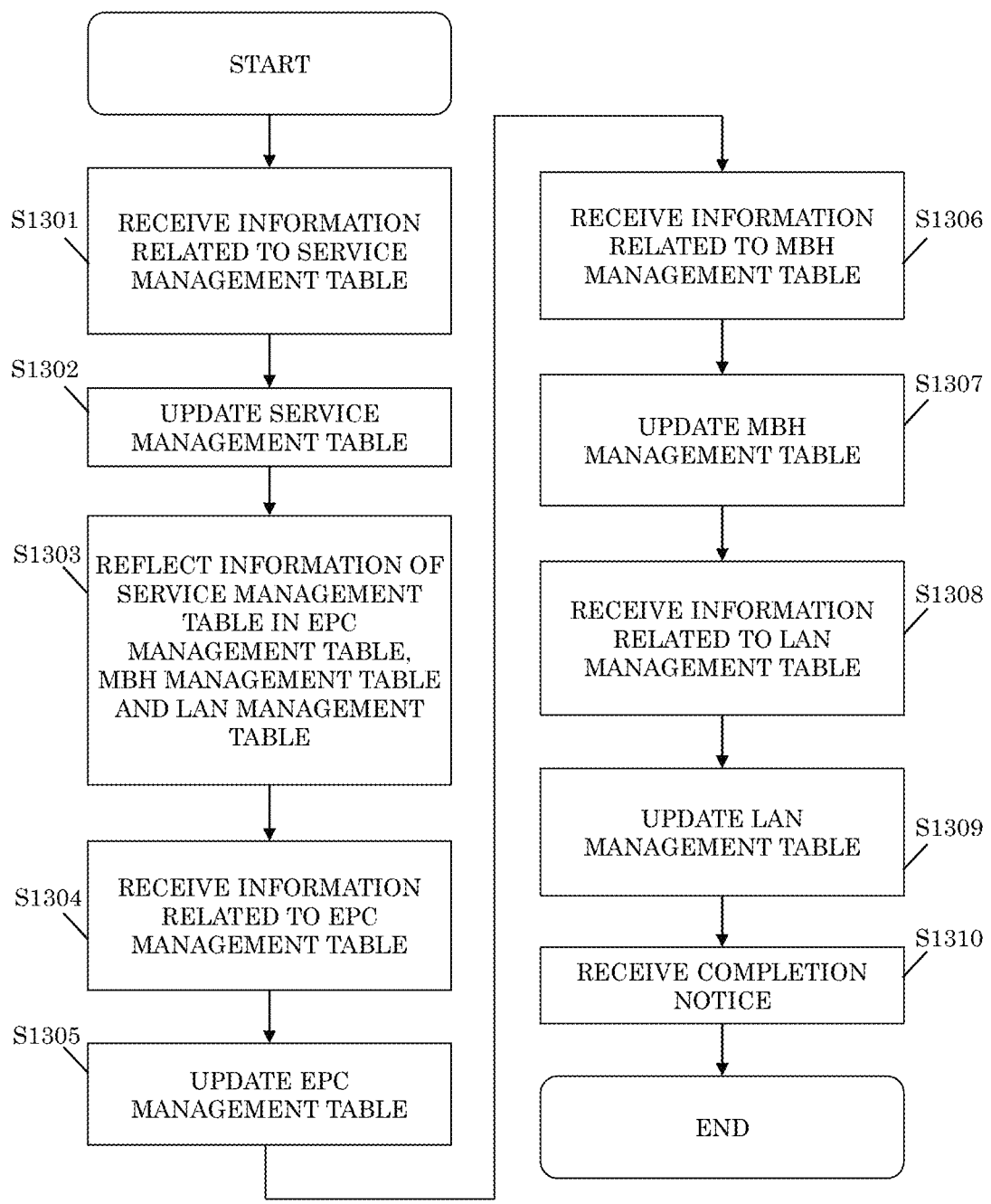
FIG. 13 is a diagram showing an example of the flow of the table construction processing according to the first embodiment.

FIG. 13 is a diagram showing an example of the flow of the table construction processing.

The information management unit 511 provides a user interface (for instance, a GUI or a CLT) for receiving information to be registered in the service management table 521, and receives information from the user (for instance, a network administrator in a company that owns the factory) via the user interface (S1301). The information management unit 511 registers, in the service management table 521, the information received in S1301 (S1302). The information to be received is one or more information sets. An information set is, for example, a set of a service level name 802, a RAN priority setting 803, an MBH priority setting 804 and a LAN priority setting 805. The entry ID 801 may be automatically assigned by the information management unit 511, or received from the user.

The information management unit 511 reflects the information, which was registered in the service management table 521, in the EPC management table 522, the MBH management table 523 and the LAN management table 524 (S1303). Specifically, for example, the registered information may be reflected in the following manner.

(1) An entry is constructed for each of the EPC management table 522, the MBH management table 523 and the LAN management table 524 for each value (for instance, "High", "Middle" or "Low") of the RAN priority setting 803, the MBH priority setting 804 and the LAN priority setting 805. For example, with regard to each of the EPC management table 522 and the MBH management table 523, the constructed entries may correspond 1:1 with the entries of the service management table 521, and the same value as the entry ID 801 of the entry corresponding to that entry may be registered as an entry ID in each of the constructed entries.

(2) A value (for instance, "High", "Middle" or "Low") of the priority corresponding to the entry is registered in the priority 902, 1002 or 1202 of the constructed entry.

The information management unit 511 provides a user interface for receiving information to be registered in the EPC management table 522, and receives information via the user interface (S1304). The information management unit 511 registers, in the EPC management table 522, the information received in S1304 (S1305). The information to be received is one or more information sets. An information set is, for example, a set of a flow identifier 903, a value 904, a VPEC name 905, a QCI 906 and a SIM ID 907. The entry ID 901 may be automatically assigned by the information management unit 511, or received from the user. A value including at least one SIM ID 907 (ID of the SIM card) can be subsequently added or deleted. In other words, the value in the SIM ID 907 may be increased or decreased according to the increase or decrease of the UE belonging to the corresponding service segment 101.

The information management unit 511 provides a user interface for receiving information to be registered in the MBH management table 523, and receives information via the user interface (S1306). The information management unit 511 registers, in the MBH management table 523, the information received in S1306 (S1307). The information to be received is one or more information sets. An information set is, for example, a set of a flow identifier 1003, an upstream flow identifier 1004, a value 1005, a downstream flow identifier 1006 and a value 1007. The entry ID 1001 may be automatically assigned by the information management unit 511, or received from the user.

The information management unit 511 provides a user interface for receiving information to be registered in the LAN management table 524, and receives information via the user interface (S1308). The information management unit 511 registers, in the LAN management table 524, the information received in S1308 (S1309). The information to be received is one or more information sets. An information set is, for example, a set of a flow identifier 1203, an upstream flow identifier 1204, a value 1205, a downstream flow identifier 1206 and a value 1207. The entry ID 1201 may be automatically assigned by the information management unit 511, or received from the user.

The information management unit 511 receives a completion notice from the user (S1310). In the foregoing case, the table construction processing is ended. Note that, in the table construction processing, in substitute of the user interface being independent for each of the management tables 521 to 524, the user interface may also be a user interface which receives information registered in at least two management tables among the management tables 521 to 524.

Figure 14:
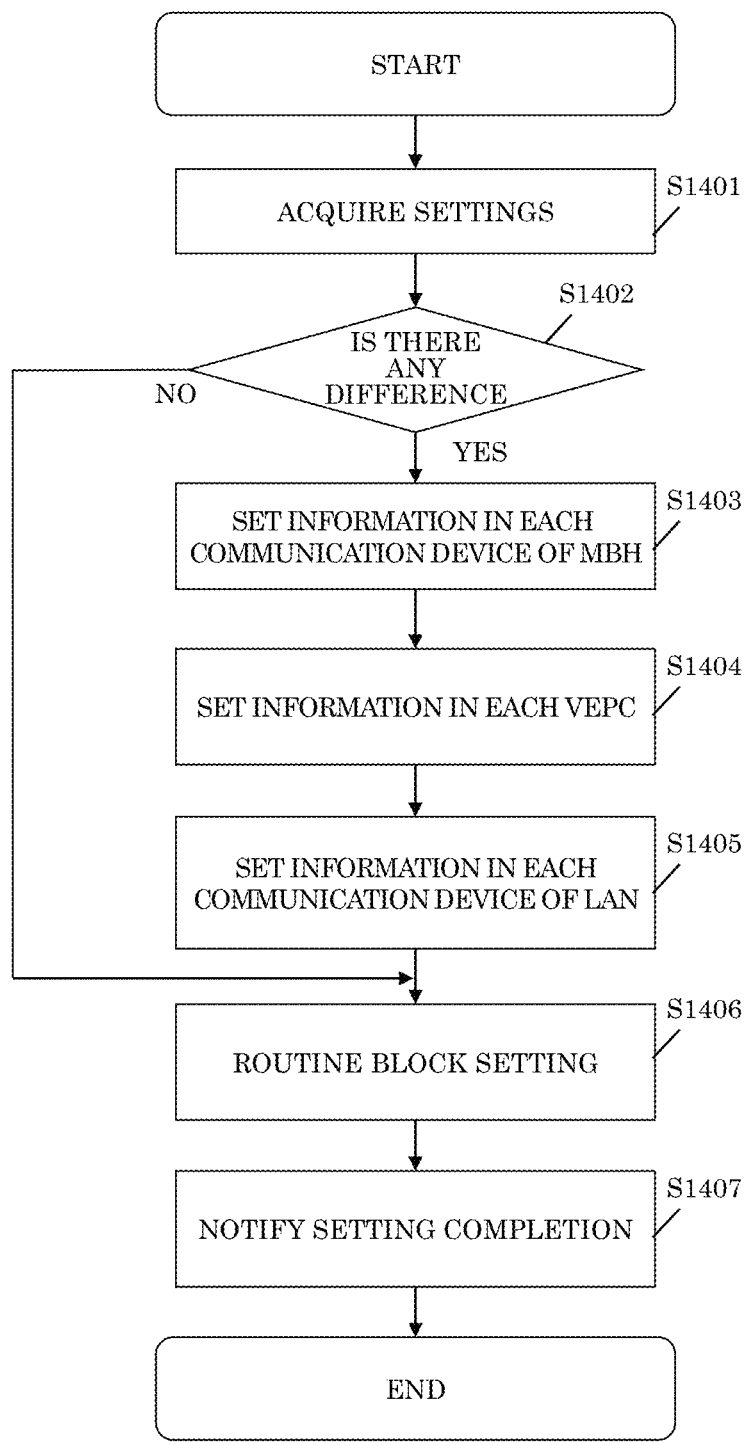
FIG. 14 is a diagram showing an example of the flow of the information setting

FIG. 14 is a diagram showing an example of the flow of the information setting processing.

The information setting unit 512 acquires a previous table group, which is a table group (management tables 522 to 524) during the previous information setting processing, and a latest table group (S1401). The information setting unit 512 determines whether the latest table group differs from the previous table group (S1402). When the determination result of S1402 is true; that is, when there is difference information, S1403 to S1405 are performed. Here, in the initial information setting processing, since there is no previous table group, the overall table group corresponds to the difference information. Moreover, the difference information may include added information which is information not included in the previous table group but included in the latest table group, and deleted information which is information included in the previous table group and included in the latest table group.

The information setting unit 512 performs information setting to each communication device 81M of the MBH 130 based on the difference information (S1403). Next, the information setting unit 512 performs information setting to each VEPC 70 in the EPC 120 based on the difference information (S1404). If there is no VEPC 70, then information setting for constructing a VEPC is performed. Next, the information setting unit 512 performs information setting to each communication device 81L in the LAN 110 based on the difference information (S1405).

When the determination result of S1402 is false, or, after S1405, the information setting unit 512 performs routing block setting (S1406). Specifically, for example, the information setting unit 512 performs the routing block setting between the VEPCs 70 to the EPC 120, and performs the routing block setting between the VLANs to the LAN 110. It is thereby possible to improve the reliability in avoiding the coexistence of packets having a different service level, and alleviate the security risk.

After S1406, the information setting unit 512 sends a setting completion notice to the user (S1407).

Whether to adopt the IP address value, the DSCP value or the VLAN value as the flow identifier may differ depending on whether the communication device 81M in the MBH 130 and whether the communication device 81L in the LAN 110 are an L3 switch or an L2 switch, and depending on the characteristics of the EPC 120. According to this embodiment, the EPC management table 522, the MBH management table 523 and the LAN management table 524 respectively exist for each type of flow identifier detectable from the packets that are sent and received. The QoS can be taken over even if the switching layer, such as the L3 or the L2, is different. Note that, in at least the table construction processing illustrated in FIG. 13 or the information setting processing illustrated in FIG. 14, the information management unit 511 or the information setting unit 512 may receive the designation of the flow identifier type from the user, and the information setting unit 512 may perform the information setting based on the management table corresponding to the designated flow identifier type.

Moreover, the value of the flow identifier is set for each of the upstream flow and the downstream flow, and the QoS corresponding to the service segment 101 is maintained for both the upstream flow and the downstream flow for each service segment 101.

Moreover, according to the processing illustrated in FIG. 14, the information setting to the EPC 120 is performed after the information setting to the MBH 130. For example, let it be assumed that the EPC 120 is configured to perform information setting to at least one of either the base station 95 or the UE via the MBH 130 based on the information set in the EPC 120. In the foregoing case, by performing the information setting to the MBH 130 before performing the information setting to the EPC 120, proper information setting from the EPC 120 to at least one of either the base station 95 or the UE is enabled.

Figure 15:
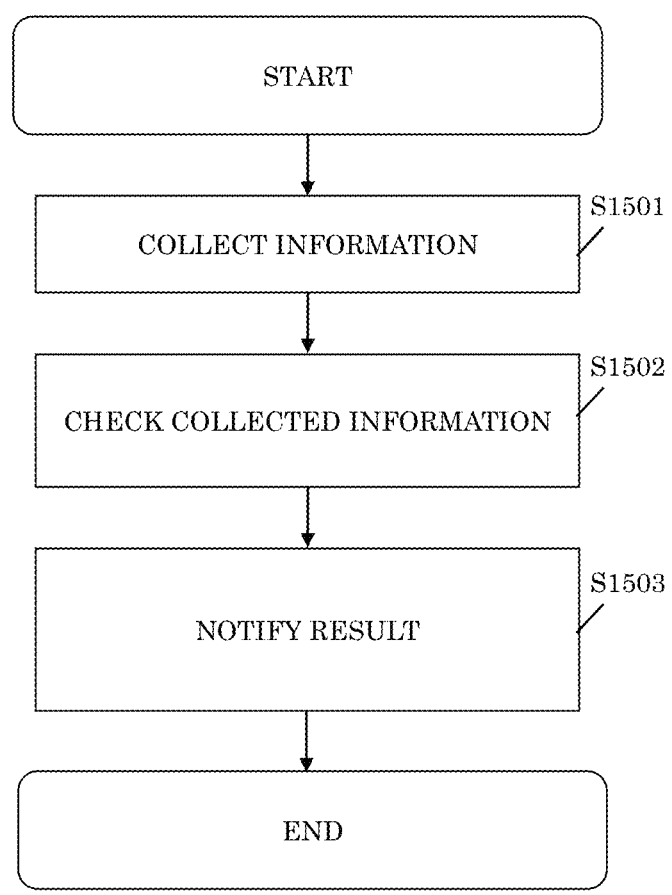
FIG. 15 is a diagram showing an example of the flow of the setting verification processing according to the first embodiment.

FIG. 15 is a diagram showing an example of the flow of the setting verification processing.

The information setting unit 512 collects information from the EPC 120 (each communication device), the MBH 130 (each communication device 81M) and the LAN 110 (each communication device 81L) (S1501). The information setting unit 512 performs a check using the collected information (S1502). The information setting unit 512 notifies the check result to the user (S1503).

The information verification processing illustrated in FIG. 15 may be, for example, at least one of the following.

(1) Verification of whether the set information is correct. Specifically, for example, this verification is performed as follows. In other words, the information setting unit 512 collects information set by the information setting unit 512 from each of the EPC 120, the MBH 130 and the LAN 110 (S1501). The information setting unit 512 determines whether the collected information is information according to the management tables 522 to 524 (S1502). The information setting unit 512 notifies the result of the determination to the user (S1503). The user is thereby able to know whether the information has been properly set.

(2) Verification of whether the expected QoS is being maintained. Specifically, for example, this verification is performed as follows. In other words, the information setting unit 512 collects metric information (for instance, metric information for each VEPC 70, metric information for each priority queue) from each of the EPC 120, the MBH 130 and the LAN 110 (S1501). The information setting unit 512 determines whether the expected QoS is being maintained for each service segment 101 from the collected metric information (S1502). The information setting unit 512 notifies the result of the determination to the user (S1503). The user is thereby able to know whether the expected QoS is being maintained.

Second Embodiment

The second embodiment is now explained. Here, differences in comparison to the first embodiment are mainly explained, and the explanation of points that are common with the first embodiment will be omitted or abbreviated.

In this embodiment, for example, a service segment group (two or more service segments 101) exists for each user, and a communication system group is shared by a plurality of different users. In this embodiment, it is possible to maintain the QoS, which is expected for each service segment 101 to which the user belongs, for each user.

The management tables 521 to 524 according to this embodiment differ from the first embodiment, for example, regarding the following points.

(1) The service management table 521 is configured, for example, as shown in FIG. 16. In other words, a column for storing a user ID 1601 and a column for storing a guaranteed minimum bandwidth 1602 are added. The user ID 1601 represents the ID of the user. The guaranteed minimum bandwidth 1602 represents the guaranteed minimum bandwidth corresponding to a set of the user and the QoS class ("Best effort" means that communication is enabled at any time when communication is possible, but if there is a packet with a high priority, then that packet transfer is given preference). In the table construction processing, the user ID and the guaranteed minimum bandwidth are also input via the user interface.

(2) The EPC management table 52 is configured, for example, as shown in FIG. 17. In other words, a guaranteed minimum bandwidth 1701A, which is information representing the guaranteed minimum bandwidth, is registered in the EPC management table 522A for each entry (here, a set of the user and the QoS class).

(3) The MBH management table 523 is configured, for example, as shown in FIG. 18. In other words, a guaranteed minimum bandwidth 1801B, which is information representing the guaranteed minimum bandwidth, is registered in the MBH management table 523B for each entry (here, a set of the user and the QoS class).

(4) The LAN management table 524 is configured, for example, as shown in FIG. 19. In other words, a guaranteed minimum bandwidth 1901B, which is information representing the guaranteed minimum bandwidth, is registered in the LAN management table 524B for each entry (here, a set of the user and the QoS class).

Figure 20:
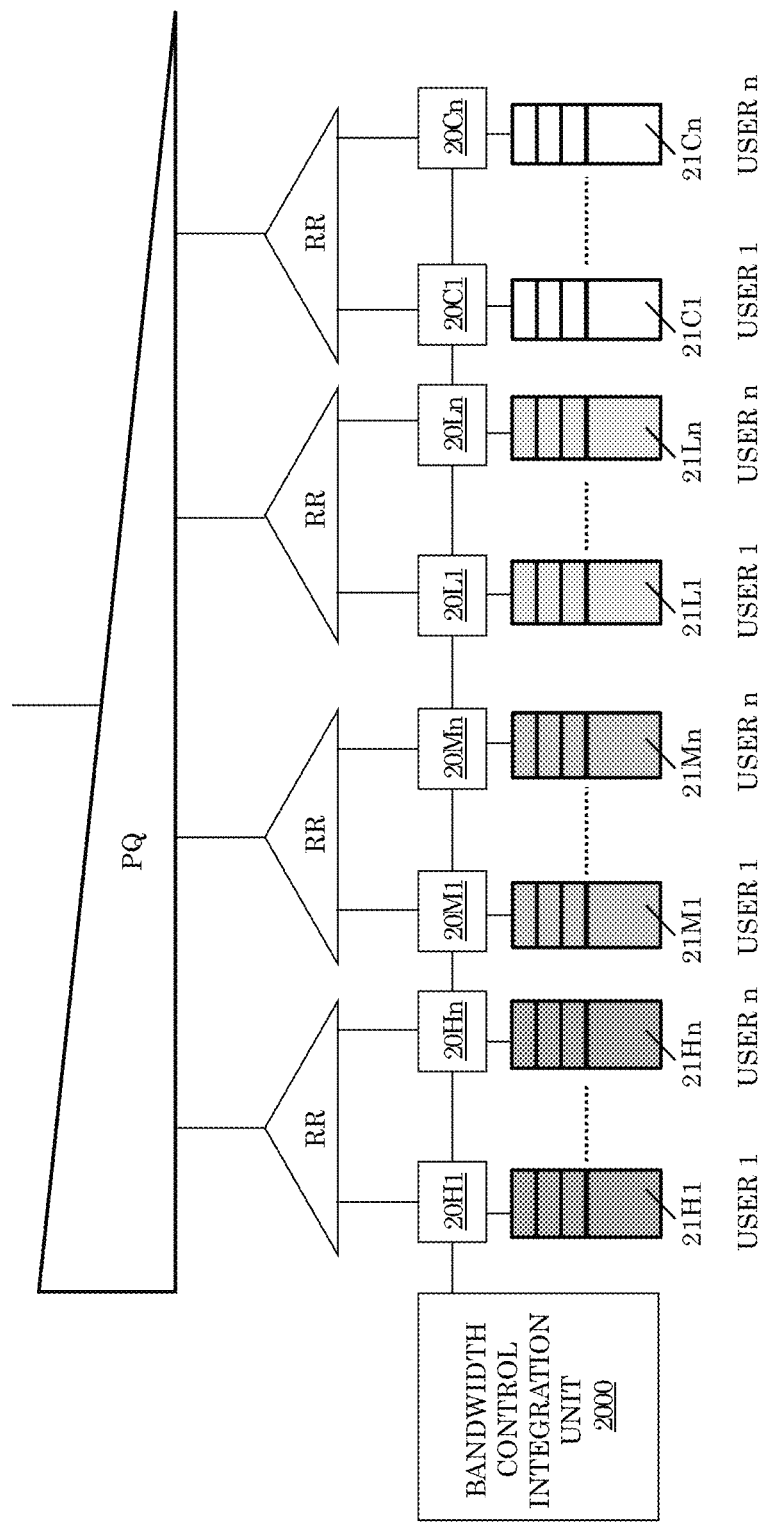
FIG. 20 is a diagram showing an example of the queue setting in the communication device according to the second embodiment.

FIG. 20 is a diagram showing an example of the queue setting in the communication device.

In this embodiment, the base station (one example of the communication device), each communication device in the EPC 120, each communication device 81B in the MBH 130, and each communication device 81L in the LAN 110 have a queue of the following structure.

In other words, with regard to each priority, a priority queue corresponding to that priority exists for each user. Furthermore, a bandwidth control unit 20 is provided for each priority queue. Moreover, a bandwidth control integration unit 2000 which integrates the bandwidth control units 20 is provided. The bandwidth control unit 20 compares the data value of the packet read from the priority queue (packet read data volume) and the guaranteed minimum bandwidth set regarding that priority queue. When there is a packet in the priority queue and the packet read data volume is equal to or less than the guaranteed minimum bandwidth, the bandwidth control unit 20 determines that it is readable, and sends a read request to a scheduler (not shown). When the guaranteed minimum bandwidth is "Best effort", the bandwidth control unit 20 performs the following control. In other words, the bandwidth control unit 20 constantly sends a read request to the scheduler when there is a packet in the priority queue. Nevertheless, when there is a packet in a priority queue in which the packet read data volume is equal to or less than the guaranteed minimum bandwidth (priority queue in which the guaranteed minimum bandwidth is not "Best effort"), the bandwidth control unit 20 waits to send a read request.

The communication device performs PQ (Priority Queueing) control. PQ control is the scheduling of preferentially reading packets from the priority queue from those of a higher priority when packets are stored in a priority queue of a high priority and the bandwidth control of a queue of a high priority is not activated (when reading is possible). Accordingly, when a priority queue having a different priority for each user is provided, packets can be preferentially read (discharged), as the priority is higher, for each user.

The communication device performs RR (Round Robin) control. RR control is the scheduling of fairly reading packets from the queue when packets are stored in the priority queue and the bandwidth control is not activated (when reading is possible). For example, the bandwidth control integration unit 2000 may sequentially activate the bandwidth control unit 20 based on RR control. Note that it will be sufficient so as long as a plurality of users are treated fairly, and other types of control may be adopted in substitute for RR control.

As a result of each communication device (base station 95, each communication device of the EPC 120, each communication device 81B, each communication device 81L) having the queue structure illustrated in FIG. 20 and the control explained with reference to FIG. 20 being performed, even when a plurality of users are accommodated in the same network, an End to End division, which suppresses the transfer delay of a packet having a high transfer priority, can be set while reliably guaranteeing the bandwidth set for each user.

Third Embodiment

The third embodiment is now explained. Here, differences in comparison to the first and second embodiments are mainly explained, and the explanation of points that are common with the first and second embodiments will be omitted or abbreviated.

FIG. 21 is a diagram showing a configuration example of the overall system according to the third embodiment.

According to the third embodiment, a switch group (for instance, one or more networks switches) 240 is interposed between the LAN 110 and the server 50. An external NW 242 is connected to the switch group 240 via a GW (gateway) 241. A device 243, which may become the other end of the communication in which the UE is the one end of such communication, is connected to the external NW 242.

According to this embodiment, as an example of the second device, a device 243 connected to an external network 242 of the communication system group (the MBH 130, the EPC 120 and the LAN 110) may also be adopted in substitute for or in addition to the server 50.

While several embodiments were explained above, these are merely illustrations for explaining the present invention, and there is no intent of limiting the scope of the present invention to these embodiments. The present invention may also be worked in other various types of modes.

For example, the present invention can also logically partition a network in an environment other than a factory into a plurality of logical partitions. For instance, logical partitions may be provided for each business division (development division, procurement division), or provided for each usage (for instance, voice call, webpage browsing). To put it differently, business divisions or usages may be adopted as the service level.

Moreover, for example, the third communication system may be an example of the first communication system, the first communication system may be an example of the second communication system, and the second communication system may be an example of the third communication system. Each of the first to third communication systems may be configured from one or more communication devices. A packet sent from the first device may reach the second device by passing through, in order, the second communication system, the first communication system and the third communication system. A packet sent from the second device may reach the first device by passing through, in order, the third communication system, the first communication system and the second communication system. Among the first to third communication systems, for example, with regard to the first communication system or the third communication system, a plurality of communication devices configuring such communication system may be configured from one or more networks. A column of the priority setting may exist in the service management table 521, for example, for each network. Moreover, a management table representing, for each QoS class, the flow identifier type and the flow identifier value for each of the upstream flow and the downstream flow may also be prepared.

Although the present disclosure has been described with reference to example embodiments, those skilled in the art will recognize that various changes and modifications may be made in form and detail without departing from the spirit and scope of the claimed subject matter.

What is claimed is:

1. A network management system, comprising:
an information management unit which manages management information of each of a first communication system, a second communication system and a third communication system passed through by packets that are sent and received via wireless communication between a plurality of first devices and a plurality of second devices; and
an information setting unit which performs information setting to the first communication system, the third communication system and the second communication system for dividing a communication system group, which includes the first communication system, the second communication system and the third communication system, into a plurality of logical partitions each corresponding to a plurality of different service levels based on the management information of each of the first communication system, the second communication system and the third communication system,
wherein:
the plurality of first devices are devices which communicate with one or more base stations;
the third communication system is a core network;
the first communication system is a network which connects the core network and one or more base stations;
the second communication system is a network which connects the core network and the plurality of second devices; and
a logical partition corresponding to a service level with regard to each of the plurality of different service levels is a partition passed through by packets that are sent and received via wireless communication between the first device and the second device belonging to that service level.

2. The network management system according to claim 1, wherein the information setting unit sets, in the third communication system, a plurality of virtual third communication systems each corresponding to a plurality of different service levels based on the management information of the third communication system.

3. The network management system according to claim 2, wherein the information setting unit:
sets, in the first communication system, a plurality of priority queues each corresponding to the plurality of service levels for each of an upstream flow as communication to the second device side and a downstream flow as communication to the first device side based on the management information of the first communication system; and
sets, in the second communication system, a plurality of priority queues each corresponding to the plurality of service levels for each of the upstream flow and the downstream flow based on the management information of the second communication system.

4. The network management system according to claim 2, wherein:
the management information of the third communication system exists for each type of flow identifier detectable from the packets that are sent and received, and represents a relation of the service level, the flow identifier and an identifier of the virtual third communication system;
the management information of the first communication system exists for each type of flow identifier detectable from the packets that are sent and received, and represents a relation of the service level, an upstream flow identifier and a downstream flow identifier; and
the management information of the second communication system exists for each type of flow identifier detectable from the packets that are sent and received, and represents a relation of the service level, the upstream flow identifier and the downstream flow identifier.

5. The network management system according to claim 4, wherein when an IP address value is set in an IP field of the packets that are sent and received between the base station and the virtual third communication system, and, when the type of the flow identifier detectable from the packets that are sent and received between the base station and the virtual third communication system is an IP address, the upstream flow identifier is a value of a destination IP address and the downstream flow identifier is a value of a source IP address in the management information of the first communication system.

6. The network management system according to claim 4, wherein, when, in a DSCP (Differentiated Services Code Point) field of the packets that are sent and received between the base station and virtual third communication system, set is a DSCP value equivalent to a QCI (QoS Class Identifier) which corresponds to the service level corresponding to the virtual third communication system and which has been set by the virtual third communication system in the base station, and, when the type of the flow identifier detectable from the packets that are sent and received between the base station and the virtual third communication system is a DSCP, the upstream flow identifier and the downstream flow identifier are respectively a DSCP value in the management information of the first communication system.

7. The network management system according to claim 4, wherein when a virtual second communication system is provided for each virtual third communication system, and, when the type of the flow identifier detectable from the packets that are sent and received between the base station and the virtual third communication system is a virtual second communication system, the upstream flow identifier and the downstream flow identifier are respectively a value of the virtual second communication system in the management information of the first communication system.

8. The network management system according to claim 4, wherein when a virtual second communication system is provided for each virtual third communication system, and, when the type of the flow identifier detectable from the packets that are sent and received between the virtual third communication system and the second communication system is a virtual second communication system, the upstream flow identifier and the downstream flow identifier are respectively a value of the virtual second communication system in the management information of the second communication system.

9. The network management system according to claim 4, wherein when an IP address value is set in an IP field of the packets that are sent and received between the virtual third communication system and the second communication system, and, when the type of the flow identifier detectable from the packets that are sent and received between the virtual third communication system and the second communication system is an IP address, the upstream flow identifier is a value of a source IP address and the downstream flow identifier is a value of a destination IP address in the management information of the second communication system.

10. The network management system according to claim 2,
wherein:
a virtual second communication system is provided for each virtual third communication system; and
the information setting unit sets a routing block between the virtual third communication systems in the third communication system, and sets a routing block between the virtual second communication systems in the second communication system.

11. The network management system according to claim 1,
wherein:
the information management unit, for each of the first communication system, the third communication system and the second communication system,
receives information via a user interface for receiving information to be included in the management information of the communication system, and
includes the received information in the management information; and
the information setting unit
sets, in the first communication system, information based on the management information of the first communication system,
thereafter sets, in the third communication system, information based on the management information of the third communication system which performs information setting to at least one of either the base station or the first device via the first communication system, and
thereafter sets, in the second communication system, information based on the management information of the second communication system.

12. The network management system according to claim 1,
wherein the information setting unit
collects information from each of the first communication system, the third communication system and the second communication system, and
performs, based on the collected information, at least one of either determining whether the set information is correct, or determining whether an expected service level based on the set information is being maintained.

13. The network management system according to claim 3,
wherein:
a guaranteed minimum bandwidth corresponding to a user is associated with each several level represented with the management information of each of the first communication system, the third communication system and the second communication system; and
a plurality of priority queues each corresponding to the plurality of service levels in each of the first communication system and the second communication system are set for each user.

14. The network management system according to claim 1,
wherein at least one among the plurality of second devices is a device connected to the second communication system and connected an external network of the communication system group.

15. A network management method, comprising the steps of:
a computer referring to management information of each of a first communication system, a second communication system and a third communication system passed through by packets that are sent and received via wireless communication between a plurality of first devices and a plurality of second devices; and
the computer performing information setting to the first communication system, the third communication system and the second communication system for dividing a communication system group, which includes the first communication system, the second communication system and the third communication system, into a plurality of logical partitions each corresponding to a plurality of different service levels based on the management information of each of the first communication system, the second communication system and the third communication system,
wherein:
the plurality of first devices are devices which communicate with one or more base stations;
the third communication system is a core network;
the first communication system is a network which connects the core network and one or more base stations;
the second communication system is a network which connects the core network and the plurality of second devices; and
a logical partition corresponding to a service level with regard to each of the plurality of different service levels is a partition passed through by packets that are sent and received via wireless communication between the first device and the second device belonging to that service level.

* * * * *